US012772363B2

(12) United States Patent
Yang et al.

(10) Patent No.: US 12,772,363 B2
(45) Date of Patent: Oct. 20, 2026

(54) ELECTRONIC DEVICE

(71) Applicant: InnoLux Corporation, Miao-Li County (TW)

(72) Inventors: Tsung-Yu Yang, Miao-Li County (TW); Ming-Huang Chen, Miao-Li County (TW); Chuan-Chi Chien, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 161 days.

(21) Appl. No.: 18/923,994

(22) Filed: Oct. 23, 2024

(65) Prior Publication Data

US 2025/0176088 A1 May 29, 2025

(30) Foreign Application Priority Data

Nov. 27, 2023 (CN) ......................... 202311604797.1

(51) Int. Cl.
*H05F 1/00* (2006.01)

(52) U.S. Cl.
CPC ...................................... *H05F 1/00* (2013.01)

(58) Field of Classification Search
CPC ........................................................ H05F 1/00
USPC ........................................................... 349/40
See application file for complete search history.

(56) References Cited

U.S. PATENT DOCUMENTS

| | | | | |
|---|---|---|---|---|
| 6,392,622 B1 * | 5/2002 | Ozawa | G02F 1/136204 | 349/40 |
| 2009/0310051 A1 * | 12/2009 | Kim | G02F 1/136204 | 349/40 |
| 2012/0281159 A1 * | 11/2012 | Chen | G09G 3/3648 | 349/40 |
| 2015/0263043 A1 * | 9/2015 | Chen | G02F 1/1345 | 257/72 |
| 2017/0229484 A1 * | 8/2017 | Chen | G02F 1/1345 | |

FOREIGN PATENT DOCUMENTS

| | | |
|---|---|---|
| CN | 114784058 A | 7/2022 |
| TW | 201525789 A | 7/2015 |

* cited by examiner

*Primary Examiner* — Christopher M Raabe
(74) *Attorney, Agent, or Firm* — McClure, Qualey & Rodack, LLP

(57) ABSTRACT

An electronic device is provided. The electronic device includes a first panel including a first substrate, a second substrate, a plurality of first conductive pads, a first conductive ring, and a first electrostatic protection structure. The first substrate includes a first electronic component bonding area. The second substrate is disposed opposite to the first substrate. The plurality of first conductive pads are disposed on the first electronic component bonding area. The first conductive ring is disposed on the first substrate. The first electrostatic protection structure includes a first line end portion and a second line end portion that are opposite to each other. The first line end portion is connected to one of the plurality of first conductive pads. The second line end portion is connected to the first conductive ring. Moreover, the first conductive ring is electrically connected to a ground potential.

20 Claims, 12 Drawing Sheets

ELECTRONIC DEVICE

CROSS REFERENCE TO RELATED APPLICATIONS

This application claims the benefit of China Application No. 202311604797.1, filed Nov. 27, 2023, the entirety of which is incorporated by reference herein.

BACKGROUND

Technical Field

The present disclosure is related to an electronic device, and in particular it is related to an electronic device with an electrostatic protection structure.

Description of the Related Art

Electronic devices have become indispensable necessities in life. Reflective electronic devices (display devices) save power consumption and achieve green energy and environmental protection. Such devices have gradually attracted attention and can be used in e-books, electronic bulletin boards and other products.

In the manufacture of electronic devices, there are many processes that will cause static electricity accumulation. For example, the component bonding process, cutting process and/or laminating process may generate static charges. These electrostatic discharge (ESD) may cause damage to components in electronic devices and affects the reliability of electronic devices.

Therefore, developing an electrostatic protection structure that can improve the reliability or performance of electronic devices is still one of the current research topics in the industry.

SUMMARY

In accordance with some embodiments of the present disclosure, an electronic device is provided. The electronic device includes a first panel. The first panel includes a first substrate, a second substrate, a plurality of first conductive pads, a first conductive ring, and a first electrostatic protection structure. The first substrate includes a first electronic component bonding area. The second substrate is disposed opposite to the first substrate. The plurality of first conductive pads are disposed on the first electronic component bonding area. The first conductive ring is disposed on the first substrate. The first electrostatic protection structure includes a first line end portion and a second line end portion. The first line end portion and the second line end portion are opposite each other. The first line end portion is connected to one of the plurality of first conductive pads. The second line end portion is connected to the first conductive ring. The first conductive ring is electrically connected to a ground potential.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION

Figure 1:
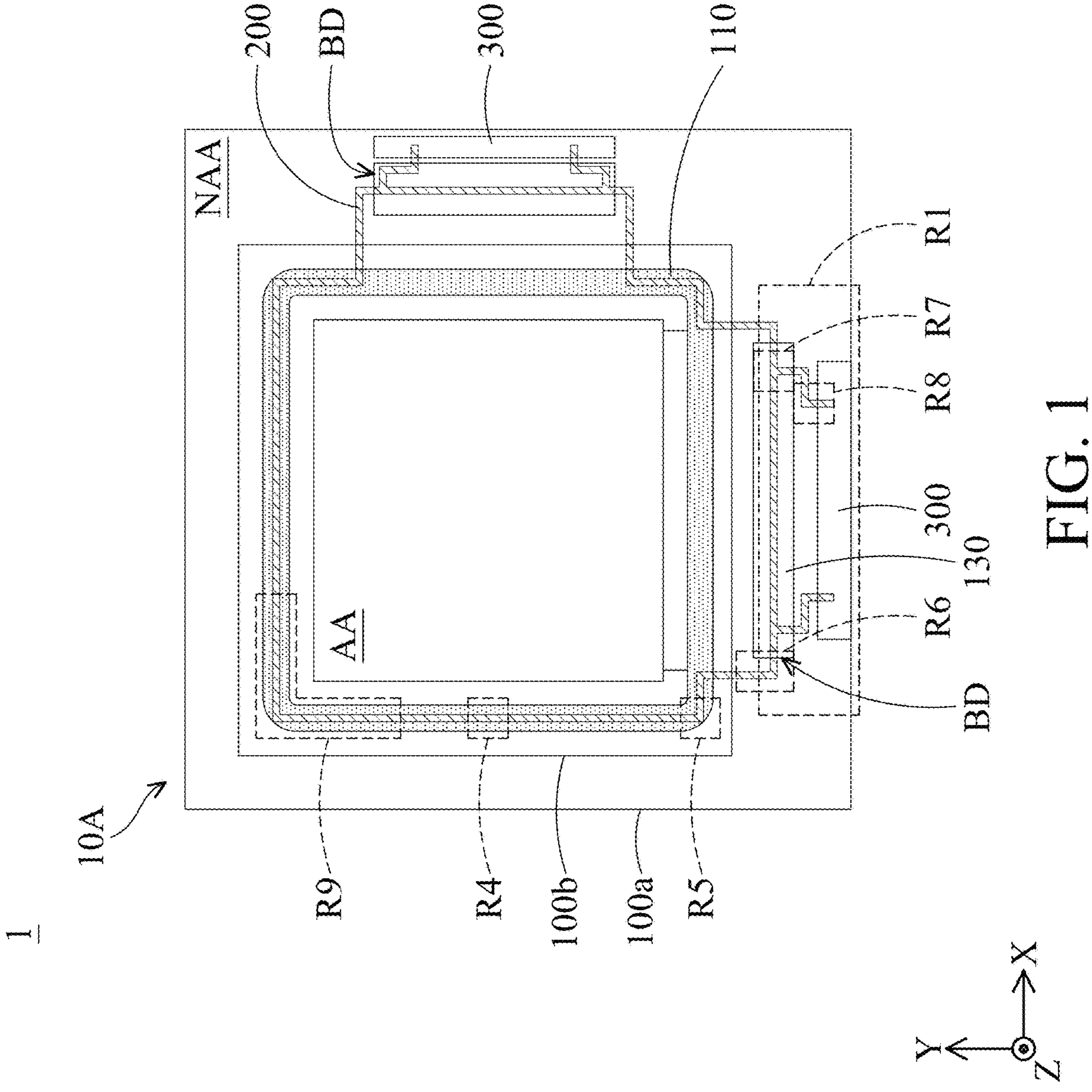
FIG. 1 is a top-view diagram of an electronic device in accordance with some embodiments of the present disclosure.

The following description lists various embodiments to introduce the basic concepts of the present disclosure, and they are not intended to limit the content of the present disclosure. The actual claimed scope of the present disclosure should be defined in accordance with the claims. Reference will now be made in detail to exemplary embodiments of the present disclosure, examples of which are illustrated in the accompanying drawings. Whenever possible, the same reference numerals are used in the drawings and descriptions to refer to the same or similar parts.

The electronic device according to the present disclosure is described in detail in the following description. It should be understood that in the following detailed description, for purposes of explanation, numerous specific details and embodiments are set forth in order to provide a thorough understanding of the present disclosure. The elements and configurations described in the following detailed description are set forth in order to clearly describe the present disclosure. These embodiments are used merely for the purpose of illustration, and the present disclosure is not limited thereto. In addition, different embodiments may use like and/or corresponding numerals to denote like and/or corresponding elements in order to clearly describe the present disclosure. However, the use of like and/or corresponding numerals of different embodiments does not suggest any correlation between different embodiments.

It should be understood that relative expressions may be used in the embodiments. For example, “lower”, “bottom”, “higher” or “top” are used to describe the position of one element relative to another. It should be appreciated that if a device is flipped upside down, an element that is “lower” will become an element that is “higher”. The present disclosure can be understood by referring to the following detailed description in connection with the accompanying drawings. The drawings are also regarded as part of the description of the present disclosure. It should be understood that the drawings of the present disclosure may be not drawn to scale. In fact, the size of the elements may be arbitrarily enlarged or reduced to clearly represent the features of the present disclosure.

In the present disclosure, the expression “one structure (or layer, component, or substrate) is located on/above another structure (or layer, component, or substrate)” means that the two structures are adjacent and directly connected, or that the two structures are adjacent rather than directly connected. Indirect connection means that there is at least one intermediary structure (or intermediary layer, intermediary component, intermediary substrate, or intermediary spacer) between the two structures; the lower surface of one structure is adjacent to or directly connected to the upper surface of the intermediary structure; and the upper surface of another structure is adjacent to or directly connected to the lower surface of the intermediate structure. The intermediary structure may be composed of a single-layer or multi-layer physical structure or non-physical structure, and the present disclosure is not limited thereto. In the present disclosure, when one structure is disposed “on” another structure, it may mean that one structure is “directly” on another structure, or that one structure is “indirectly” on another structure. That is, there is at least one structure sandwiched between the two structures.

Moreover, it should be understood that the ordinal numbers used in the specification and claims, such as the terms “first”, “second”, etc., are used to modify an element, which itself does not mean and represent that the element (or elements) has any previous ordinal number, and does not mean the order of a certain element and another element, or the order in the manufacturing method. The use of these ordinal numbers is to make an element with a certain name can be clearly distinguished from another element with the same name. Claims and the specification may not use the same terms. For example, the first element in the specification may refer to the second element in the claims.

In accordance with the embodiments of the present disclosure, regarding the terms such as “connected to”, “interconnected with”, etc. referring to bonding and connection, unless specifically defined, these terms mean that two structures are in direct contact or two structures are not in direct contact, and other structures are provided to be disposed between the two structures. The terms for bonding and connecting may also include the case where both structures are movable or both structures are fixed. In addition, the term “electrically connected to” or “coupled to” may include any direct or indirect electrical connection means.

In the following descriptions, terms “about”, “substantially” and “approximately” typically mean +/−10% of the stated value, or typically +/−5% of the stated value, or typically +/−3% of the stated value, or typically +/−2% of the stated value, or typically +/−1% of the stated value or typically +/−0.5% of the stated value. The expression “in a range from the first value to the second value” or “between the first value and the second value” means that the range includes the first value, the second value, and other values in between. Moreover, certain errors may exist between any two values or directions used for comparison. If the first value is equal to the second value, it implies that there may be an error of about 10% between the first value and the second value; if the first direction is perpendicular to the second direction, the angle between the first direction and the second direction may be between 80 degrees and 100 degrees; if the first direction is parallel to the second direction, the angle between the first direction and the second direction may be between 0 degrees and 10 degrees.

Moreover, in accordance with the embodiments of the present disclosure, an optical microscope (OM), a scanning electron microscope (SEM), a film thickness profiler (α-step), an ellipsometer or another suitable method may be used to measure the thickness, length or width of each element, or distance or angle between elements. Specifically, in accordance with some embodiments, a scanning electron microscope can be used to obtain cross-sectional images of the structure and measure the thickness, length or width of each element, or distance or angle between elements.

Throughout the present disclosure and the appended claims, certain terms are used to refer to specific elements. It will be appreciated by those skilled in the art that electronic device manufacturers may refer to the same component by different names. The present disclosure is not intended to differentiate between components that have the same function but have different names. In the following description and claims, terms such as “comprise”, “include”, and “have” are open-ended terms, and therefore they should be interpreted to mean “include but not limited to . . . ”. Therefore, when the terms “comprise”, “include” and/or “have” are used in the description of the present disclosure, they specify the presence of the corresponding features, regions, steps, operations, and/or elements, but do not exclude the presence of one or more the existence of corresponding features, regions, steps, operations and/or components.

It should be understood that in the following embodiments, without departing from the spirit of the present disclosure, the features in several different embodiments can be replaced, recombined, and mixed to complete another embodiment. The features between the various embodiments can be mixed and matched arbitrarily as long as they do not violate or conflict the spirit of the present disclosure.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined. The present disclosure can be understood by referring to the following detailed description in combination with the accompanying drawings. It should be noted that, in order to make it easy for readers to understand and for the simplicity of the drawings, the multiple drawings in the present disclosure only depict a part of the electronic device. Moreover, certain elements in the drawings are not drawn to actual scale. In addition, the number and size of components in the drawings are only for illustration and are not intended to limit the scope of the present disclosure.

In accordance with some embodiment of the present disclosure, an electronic device is provided, including a conductive ring and an electrostatic protection structure electrically connected to the conductive ring. The electrostatic discharge accumulated in the electrostatic protection structure can be led away through the conductive ring, thereby reducing component damage caused by electrostatic discharge, thereby improving the reliability of the electronic device. Furthermore, in accordance with the embodiments of the present disclosure, the electrostatic protection structure may not use a semiconductor layer, thus simplifying the manufacturing process or reducing production costs.

The electronic device of the present disclosure includes electronic components. The electronic components may include passive components, active components, or a combination thereof, such as capacitors, resistors, inductors, varactor diodes, variable capacitors, filters, diodes, transistors, inductors, microelectromechanical systems (MEMS), liquid crystal chips, etc., but they are not limited thereto. The diodes may include light-emitting diodes or non-light-emitting diodes. The diodes include P-N junction diodes, PIN diodes or constant current diodes. The light-emitting diodes may include, for example, organic light-emitting diodes (OLEDs), mini light-emitting diodes (mini LEDs), micro light-emitting diodes (micro LEDs), and quantum dot light-emitting diodes (quantum dot LEDs), fluorescence, phosphor or other suitable materials, or a combination thereof, but they are not limited thereto. The sensors may include, for example, capacitive sensors, optical sensors, electromagnetic sensors, fingerprint sensors (FPS), touch sensors, antennas, or pen sensors, etc., but they are not limited thereto. In the following, a display device will be used as an electronic device to illustrate the present disclosure, but it is not limited thereto.

The electronic device may include an imaging device, a laminating device, a display device, a backlight device, an antenna device, a tiled device, a touch electronic device (touch display), a curved electronic device (curved display) or a non-rectangular electronic device (free shape display), but it is not limited thereto. The electronic device may include, for example, liquid crystal, light-emitting diode, fluorescence, phosphor, other suitable display media, or a combination thereof, but it is not limited thereto. The display device may be a non-self-luminous display device or a self-luminous display device. The antenna device may be a liquid-crystal type antenna device or a non-liquid-crystal type antenna device, and the sensing device may be a sensing device that senses capacitance, light, heat energy or ultrasonic waves, but it is not limited thereto. The tiled device may be, for example, a display tiled device or an antenna tiled device, but it is not limited thereto. It should be noted that the electronic device can be any combination of the above, but it is not limited thereto. The electronic device may be a bendable or flexible electronic device. It should be noted that the electronic device can be any combination of the above, but it is not limited thereto. In addition, the shape of the electronic device may be a rectangular shape, a circular shape, a polygonal shape, a shape with curved edges, or other suitable shapes. The electronic device may have peripheral systems such as a driving system, a control system, a light source system, a shelf system, etc. to support the display device, antenna device or tiled device. It should be noted that the following embodiments can be replaced, reorganized, and combined with features of several different embodiments to complete other embodiments without departing from the spirit of the present disclosure. Features in various embodiments may be mixed and matched as long as they do not violate the spirit of the present disclosure or conflict with each other.

Figure 2:
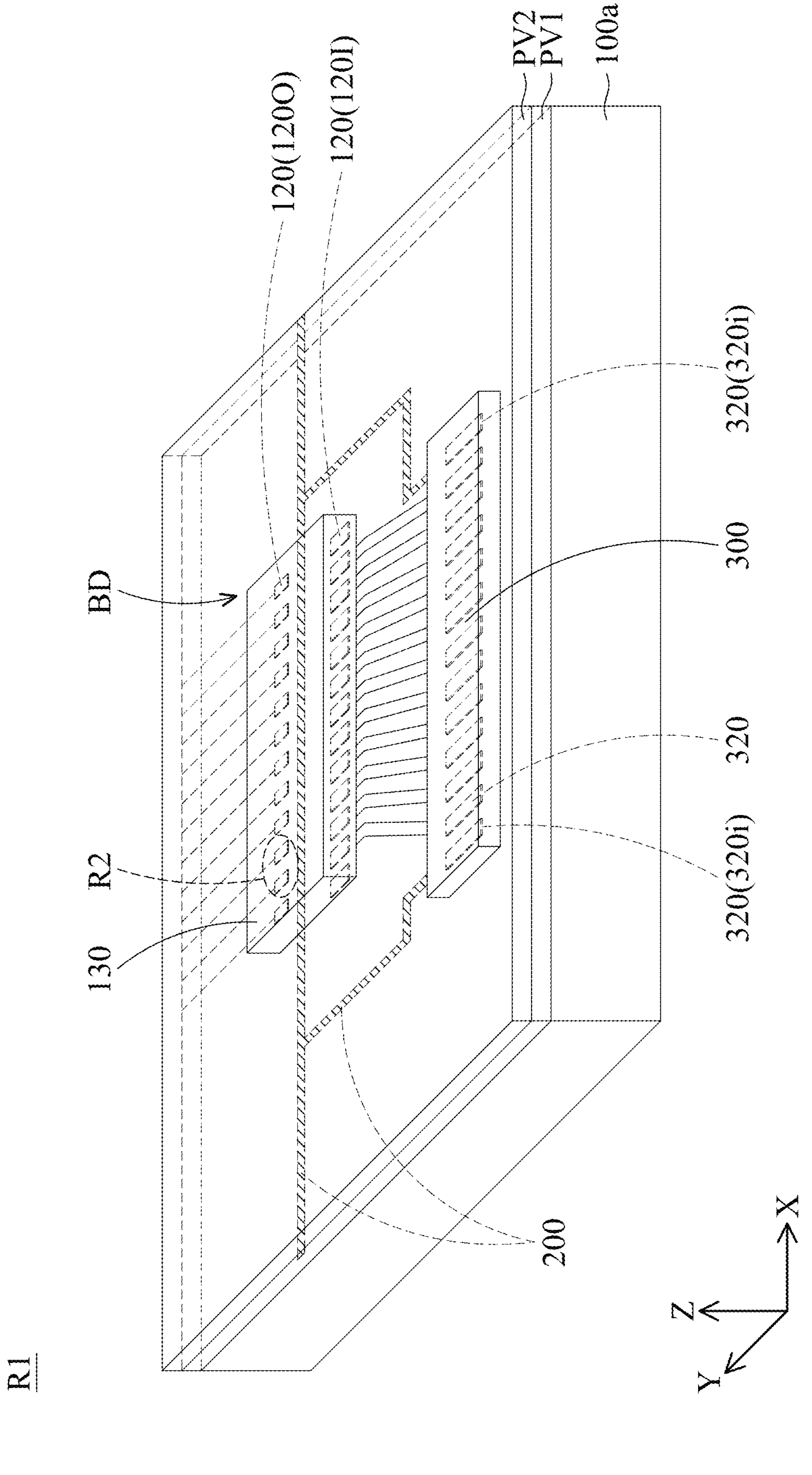
FIG. 2 is a three-dimensional diagram of an electronic device corresponding to the region R1 of FIG. 1 in accordance with some embodiments of the present disclosure.

Please refer to FIG. 1 and FIG. 2. FIG. 1 is a top-view diagram of an electronic device 1 in accordance with some embodiments of the present disclosure. FIG. 2 is a three-dimensional diagram of the electronic device 1 corresponding to the region R1 of FIG. 1 in accordance with some embodiments of the present disclosure. It should be understood that, for clarity of explanation, some components of the electronic device 1 may be omitted in the drawings, and only some components are schematically illustrated. In accordance with some embodiments, additional features may be added to the electronic device 1 described below. As shown in FIG. 1 and FIG. 2, the electronic device 1 includes a panel 10A. The panel 10A includes a substrate 100*a*, a substrate 100*b*, and a sealant 110. The substrate 100*a* may be disposed opposite to the substrate 100*b*. The sealant 110 may be disposed between the substrate 100*a* and the substrate 100*b* and include a plurality of conductive particles 110P (as shown in FIG. 5B). It should be understood that, for the purpose of clear explanation, the drawings do not illustrate the upper and lower positional relationships of the components, and the size relationship between the substrate 100*a* and the substrate 100*b* is not limited to that shown in the drawings. In accordance with some embodiments, the panel 10A has an active area AA and a peripheral area NAA adjacent to the active area AA. The peripheral area NAA may be adjacent to at least one side of the active area AA. In accordance with some embodiments, the peripheral area NAA may be disposed surrounding the active area AA. In accordance with some embodiments, the active area AA may include, for example, a display area, a detection area, a touch area, a light-emitting area, another suitable application area, or a combination thereof.

In accordance with some embodiments, the substrate 100*a* can serve as a driving substrate (or array substrate), and the substrate 100*a* is provided with a driving circuit, such as a passive driving circuit, but it is not limited thereto. In accordance with some embodiments (not illustrated), the substrate 100*a* is provided with an active driving circuit (e.g., including a transistor). In accordance with some embodiments, a color filter layer is disposed on the substrate 100*b*, but it is not limited thereto. In accordance with some embodiments, a color filter layer is disposed on the substrate 100*a*. In accordance with some embodiments, the substrate 100*a* and/or the substrate 100*b* may include a flexible substrate, a rigid substrate, or a combination thereof, but it is not limited thereto. In accordance with some embodiments, the substrate 100*a* and/or the substrate 100*b* may include a light-transmitting substrate, but it is not limited thereto. In accordance with some embodiments, the material of the substrate 100*a* and/or the substrate 100*b* may include glass, quartz, sapphire, ceramic, polyimide (PI), polycarbonate (PC), polyethylene terephthalate (PET), polypropylene (PP), another suitable material or a combination thereof, but it is not limited thereto. Furthermore, the material of the substrate 100*a* may be the same as or different from the material of the substrate 100*b*.

Specifically, the substrate 100*a* includes an electronic component bonding area BD. In accordance with some embodiments, the electronic component bonding area BD may be located in the peripheral area NAA of the panel 10A. In accordance with some embodiments, an electronic component 130 is disposed on the electronic component bonding area BD. The electronic component 130 may include, for example, an integrated circuit (IC) component, but it is not limited thereto.

In accordance with some embodiments, a circuit board 300 is electrically connected to the panel 10A, and the circuit board 300 is disposed on the substrate 100*a*. In accordance with some embodiments, the circuit board 300 is electrically connected to the electronic component 130. In accordance with some embodiments, the circuit board 300 may include a flexible printed circuit (FPC) or a chip on film (COF) package, but it is not limited thereto.

Furthermore, the panel 10A includes a plurality of conductive pads 120. The conductive pads 120 may be disposed on the electronic component bonding area BD. In accordance with some embodiments, the conductive pads 120 may be electrically connected to the electronic component 130 and the circuit board 300. In accordance with some embodiments (as shown in FIG. 2), a part of the conductive pads 120 (labeled as 1200) can serve as the conductive pads for signal output terminal of the electronic component 130, and a part of the conductive pads 120 (labeled as 1201) can serve as the conductive pads for signal input terminal of the electronic component 130. In accordance with some embodiments, the panel 10A includes a plurality of conductive pads 320, and the circuit board 300 is disposed on the conductive pads 320 and electrically connected to the conductive pads 320. In accordance with some embodiments, the electronic component 130 is electrically connected to the circuit board 300 through the conductive pads 1201, the conductive pads 320 and the circuits (not labeled) disposed therebetween. The conductive pads 120 and/or the conductive pads 320 may include a metal material, a transparent conductive material, another suitable conductive material, or a combination thereof, but it is not limited thereto. The metal material may include, for example, copper (Cu), silver (Ag), gold (Au), tin (Sn), aluminum (Al), molybdenum (Mo), tungsten (W), chromium (Cr), nickel (Ni), platinum (Pt), titanium (Ti), alloys of the aforementioned metals, another suitable material, or a combination thereof, but it is not limited thereto. The transparent conductive material may include transparent conductive oxide (TCO), for example, may include indium tin oxide (ITO), antimony zinc oxide (AZO), tin oxide (SnO), zinc oxide (ZnO), indium zinc oxide (IZO), indium gallium zinc oxide (IGZO), indium tin zinc oxide (ITZO), antimony tin oxide (ATO), another suitable transparent conductive material, or a combination thereof, but it is not limited thereto.

The panel 10A includes a conductive ring 200, and the conductive ring 200 is disposed on the substrate 100*a*. In accordance with some embodiments (e.g., FIG. 1 and FIG. 2), the conductive ring 200 is located in the peripheral area NAA and is disposed surrounding the active area AA. In accordance with some embodiments, the conductive ring 200 may partially overlap the electronic component bonding area BD and the circuit board 300. In the normal direction (Z direction) of the substrate 100*a*, a portion of the conductive ring 200 overlaps with the sealant 110, and the conductive ring 200 is electrically connected to the ground potential, for example, the accumulated electrostatic charge can be led out of the active area AA to reduce the electrostatic charge affecting the circuit of the active area AA or peripheral circuits. Specifically, the conductive ring 200 can be electrically connected to the designated conductive pad 320 (labeled as 320*i*, as shown in FIG. 2) of the circuit board 300, and connected to the ground potential through a system terminal (not illustrated), but it is not limited thereto. The conductive ring 200 may be connected to the ground potential via other means. The conductive ring 200 may be formed of a conductive material, such as a low-resistance metal material. In accordance with some embodiments, the low-resistance metal material may include copper (Cu), silver (Ag), gold (Au), tin (Sn), aluminum (Al), molybdenum (Mo), tungsten (W), chromium (Cr)), nickel (Ni), platinum (Pt), titanium (Ti), alloys of the aforementioned metals, another suitable material or a combination thereof, but it is not limited thereto. Furthermore, the conductive ring 200 may have a single-layer structure or a multi-layer structure. In some embodiments, the conductive ring 200 may have an arc-shaped edge at the corner in the normal direction (Z direction) of the substrate 100*a*.

As shown in FIG. 2, in accordance with some embodiments, the panel 10A includes an insulating layer PV1 and an insulating layer PV2 disposed on the substrate 100*a*, and the insulating layer PV2 is disposed on the insulating layer PV1. In accordance with some embodiments, the conductive ring 200 is disposed on the insulating layer PV1 and between the insulating layer PV1 and the insulating layer PV2, but it is not limited thereto. The insulating layer PV1 and/or the insulating layer PV2 may include an organic material, an inorganic material, another suitable material, or a combination thereof, but it is not limited thereto. In accordance with some embodiments, the inorganic material may include silicon nitride, silicon oxide, silicon oxynitride, aluminum oxide, another suitable material, or a combination thereof, but it is not limited thereto. In accordance with some embodiments, the organic material may include epoxy resin, silicone resin, acrylic resin (such as polymethylmethacrylate (PMMA)), benzocyclobutene (BCB), polyimide, polyester, polydimethylsiloxane (PDMS), perfluoroalkoxy alkane (PFA), another suitable material, or a combination thereof, but it is not limited thereto. Furthermore, the material of the insulating layer PV1 may be the same as or different from the material of the insulating layer PV2. With the arrangement of the conductive ring 200 between the insulating layer PV1 and the insulating layer PV2, the influence of moisture on the conductivity of the conductive ring 200 can be reduced, thereby improving its performance.

Figure 3A:
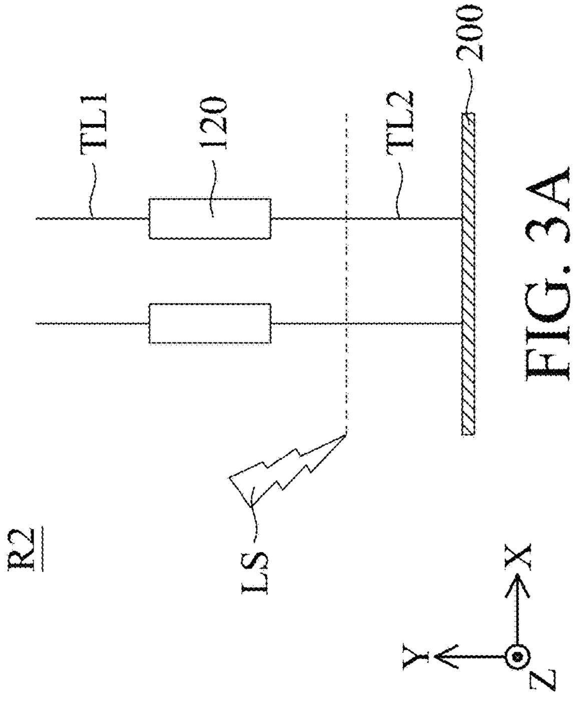
FIG. 3A is a top-view diagram of the electronic device corresponding to the region R2 of FIG. 2 in accordance with some embodiments of the present disclosure.
Figure 3B:
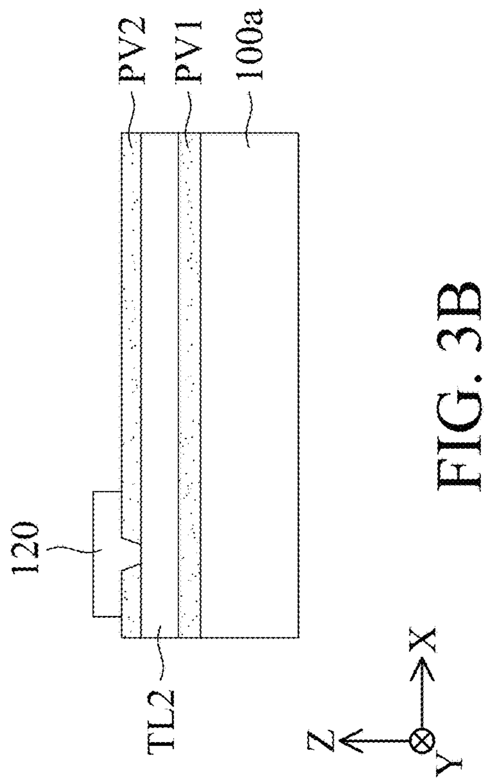
FIG. 3B is a side-view diagram of the electronic device corresponding to the region R2 of FIG. 2 in accordance with some embodiments of the present disclosure.
Figure 3C:
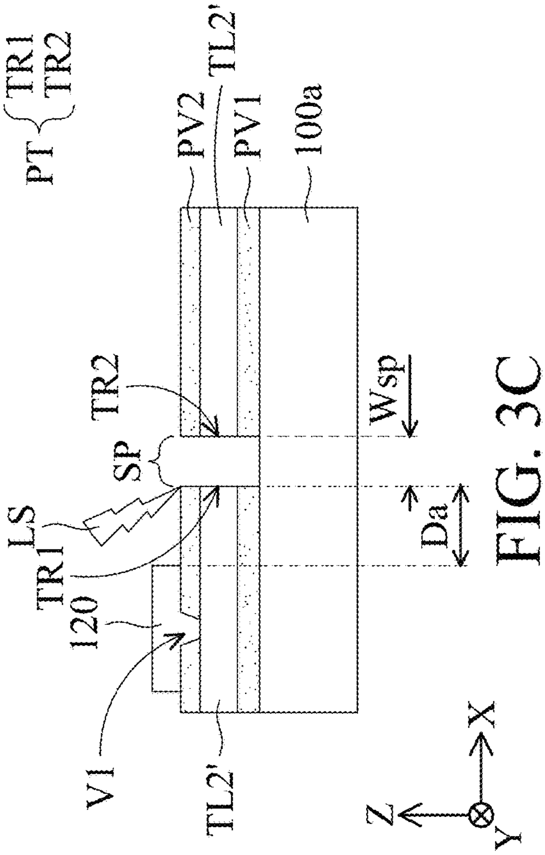
FIG. 3C is a side-view diagram of the electronic device corresponding to the region R2 of FIG. 2 in accordance with some embodiments of the present disclosure.

Next, please refer to FIG. 3A, FIG. 3B and FIG. 3C. FIG. 3A is a top-view diagram of the electronic device 1 corresponding to the region R2 of FIG. 2 in accordance with some embodiments of the present disclosure. FIG. 3B and FIG. 3C are side-view diagrams of the electronic device 1 corresponding to the region R2 of FIG. 2 in accordance with some embodiments of the present disclosure.

As shown in FIGS. 3A, 3B and 3C, the panel 10A includes an electrostatic protection structure PT, and the electrostatic protection structure PT is disposed on the electronic component bonding area BD. The electrostatic protection structure PT includes a first line end portion TR1 and a second line end portion TR2 that are opposite to each other. The first line end portion TR1 is connected to one of the plurality of conductive pads 120, and the second line end portion TR2 is connected to the conductive ring 200. In accordance with some embodiments, the first line end portion TR1 and the opposite second line end portion TR2 of the electrostatic protection structure PT may be, for example, the two end portions of line TL2', which is formed after line TL2 is disconnected. In detail, in accordance with some embodiments, one end of the conductive pad 120 (for example, the conductive pad 1200 serving as the signal output terminal of the electronic component 130) located on the electronic component bonding area BD may be connected to line TL1, and the other end may be connected to line TL2. The line TL1 can be a signal line (such as a scan line or a data line, but it is not limited thereto) that transmits signals to the active area AA, and the line TL2 can be electrically connected to the conductive ring 200. In accordance with some embodiments, the line TL1 and the line TL2 may be disposed between the insulating layer PV1 and the insulating layer PV2, and the line TL1 and the line TL2 may, for example, belong to the same material layer. The conductive pad 120 may be disposed on the insulating layer PV2 and electrically connected to the line TL2 through a via hole V1 of the insulating layer PV2. In accordance with some embodiments, the line TL2 electrically connected to the conductive ring 200 may be disconnected by performing a laser cutting process LS to form the disconnected line TL2', thereby generating two opposite line end portions TR as the electrostatic protection structure PT, but it is not limited thereto. The line TL2 electrically connected to the conductive ring 200 may be disconnected by another suitable method to form the disconnected line TL2'. In accordance with some embodiments, before the electronic component is bonded to the electronic component bonding area BD, a laser cutting process LS may be performed to disconnect the line TL2 to form the disconnected line TL2'. Specifically, the uncut line TL2 can be used, for example, to distribute static charges and reduce the concentration of static electricity at specific locations, which can reduce electrostatic damage to circuits in the active area or the electronic component bonding area BD, while the cut line TL2' can induce static electricity to the end connected to the conductive ring 200 and conduct the static electricity away through the conductive ring 200 electrically connected to the ground potential, thereby improving the effect of electrostatic protection. In addition, the line TL1 and the line TL2 may be formed of a conductive material, such as a low-resistance metal material. In accordance with some embodiments, the low-resistance metal material may include copper (Cu), silver (Ag), gold (Au), tin (Sn), aluminum (Al), molybdenum (Mo), tungsten (W), chromium (Cr), nickel (Ni), platinum (Pt), titanium (Ti), alloys of the aforementioned metals, another suitable material or a combination thereof, but it is not limited thereto. Furthermore, the line TL1 and/or the line TL2 may have a single-layer structure or a multi-layer structure.

As shown in FIG. 3C, in accordance with some embodiments, there is a spacing area SP between the two line end portions (the first line end portion TR1 and the second line end portion TR2) of the disconnected line TL2'. The spacing area SP is separated from one of the plurality of conductive pads 120 by a distance Da, and the distance Da may be greater than or equal to 200 micrometers and less than or equal to 600 micrometers (200 μm≤distance Da≤600 μm), but it is not limited thereto. In accordance with some embodiments, the distance Da may be greater than or equal to 250 micrometers and less than or equal to 550 micrometers (250 μm≤distance Da≤550 μm), but it is not limited thereto. In accordance with some embodiments, the distance Da may be greater than or equal to 250 micrometers and less than or equal to 500 micrometers (250 μm≤distance Da≤500 μm). In accordance with some embodiments, the distance Da may be greater than or equal to 250 micrometers and less than or equal to 450 micrometers (250 μm≤distance Da≤450 μm). In accordance with some embodiments, the distance Da may be greater than or equal to 250 micrometers and less than or equal to 400 micrometers (250 μm≤distance Da≤400 μm). In accordance with some embodiments, the distance Da refers to the minimum distance between the conductive pad 120 that is closest to the circuit end (for example, the first line end portion TR1) and the spacing area SP in the direction perpendicular to the normal direction of the substrate 100*a* (for example, the X direction). It should be noted that if the distance Da between the spacing area SP and the conductive pad 120 is too small (for example, less than 200 μm), the conductive pad 120 may be damaged due to the accuracy limit of the laser cutting process, and thus the electrostatic protection effect may be achieved.

Furthermore, the spacing area SP has a width Wsp in the X direction. In accordance with some embodiments, the width Wsp of the spacing area SP may be greater than or equal to 2.5 micrometers and less than or equal to 10 micrometers (2.5 μm≤width Wsp≤10 μm), or greater than or equal to 3.5 micrometers and less than or equal to 9.5 micrometers, or greater than or equal to 4 micrometers and less than or equal to 9 micrometers, or greater than or equal to 4.5 micrometers and less than or equal to 8.5 micrometers, or greater than or equal to 5 micrometers and less than or equal to 8 micrometers, for example, 5.5 micrometers, 6 micrometers, 6.5 micrometers, 7 micrometers or 7.5 micrometers, but it is not limited thereto. In accordance with some embodiments, the width Wsp refers to the minimum width of the spacing area SP measured in any cross-section in a direction perpendicular to the normal direction of the substrate 100*a* (for example, the X direction). The width Wsp can also refer to the minimum width of the spacing area SP measured at any position taken from the top-view perspective of the electronic device. It should be noted that when the spacing area SP has a width Wsp within the aforementioned range, the accuracy limit of the laser cutting process can be complied and static charges can be effectively led to the ground. In accordance with some embodiments, the line ends (the first line end portion TR1 and the second line end portion TR2) on both sides of the spacing area SP may have curved edges or flat edges.

Figure 4A:
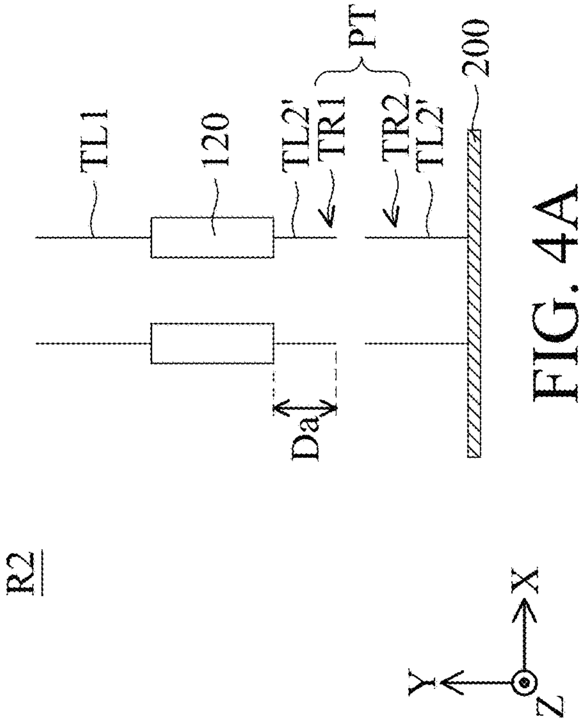
FIG. 4A is a top-view diagram of the electronic device corresponding to the region R2 of FIG. 2 in accordance with some embodiments of the present disclosure.
Figure 4B:
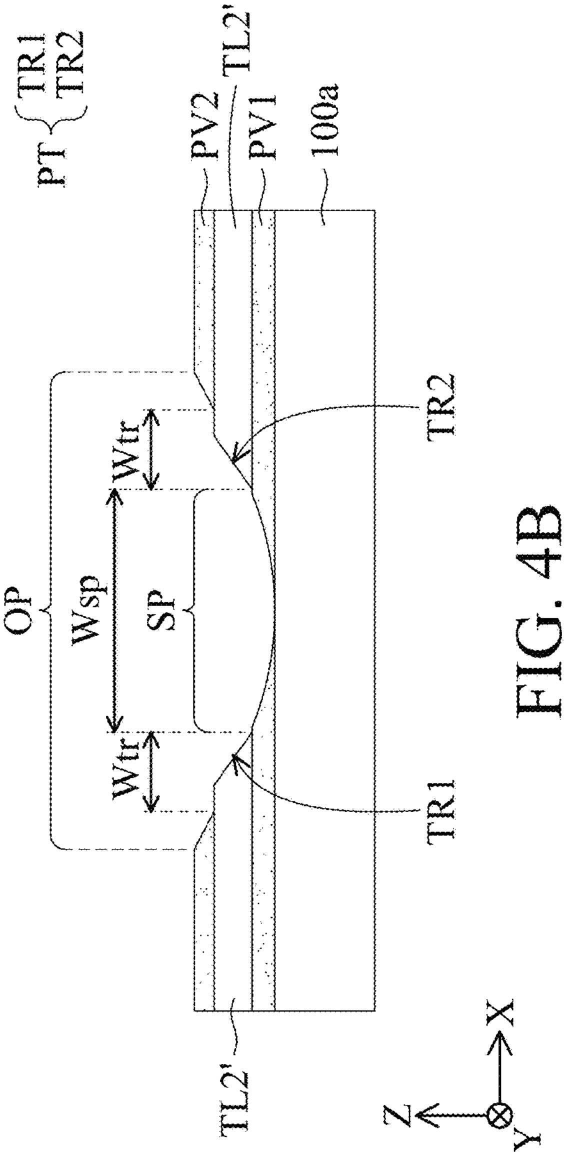
FIG. 4B is a side-view diagram of the electronic device corresponding to the region R2 of FIG. 2 in accordance with some embodiments of the present disclosure.

Next, please refer to FIG. 4A and FIG. 4B. FIG. 4A is a top-view diagram of the electronic device 1 corresponding to the region R2 of FIG. 2 in accordance with some other embodiments of the present disclosure. FIG. 4B is a side-view diagram of the electronic device 1 corresponding to the region R2 of FIG. 2 in accordance with some other embodiments of the present disclosure.

As shown in FIG. 4A and FIG. 4B, the electrostatic protection structure PT may include two opposite first line end portion TR1 and second line end portion TR2. The first line end portion TR1 is connected to one of the plurality of conductive pads 120, and the second line end portion TR2 is connected to the conductive ring 200. In accordance with some embodiments, the two opposite first line end portion TR1 and second line end portion TR2 of the electrostatic protection structure PT may be two end portions of the disconnected line TL2'. In accordance with some embodiments, one end of the conductive pad 120 (for example, the conductive pad 1200 serving as the signal output terminal of the electronic component 130) located on the electronic component bonding area BD may be connected to the line TL1, and the other end may be connected to a portion of the disconnected line TL2'. The line TL1 can be a signal line that transmits signals to the active area AA (please refer to the above description), and the other portion of the disconnected line TL2' can be electrically connected to the conductive ring 200. The disconnected line TL2' can induce static electricity to the end connected to the conductive ring 200 and conduct the static electricity away through the conductive ring 200 electrically connected to the ground potential, thereby improving the effect of electrostatic protection. In this embodiment, the line TL2 may be patterned by one or more photolithography processes and/or etching processes to form the disconnected line TL2', but it is not limited thereto. The photolithography process may include photoresist coating (such as spin coating), soft baking, hard baking, mask alignment, exposure, post-exposure baking, photoresist development, cleaning and drying, but it is not limited thereto. The etching process may include a dry etching process or a wet etching process, but it is not limited thereto. In this embodiment, two opposite line ends (the first line end portion TR1 and the second line end portion TR2) can be formed directly through a patterning process, and there is no need to perform an additional laser cutting process to disconnect the line TL2, so the manufacturing process can be simplified.

As shown in FIG. 4B, the insulating layer PV2 may be disposed on the electrostatic protection structure PT. The insulating layer PV2 may have an opening area OP, and the opening area OP may overlap with the spacing area SP between the first line end portion TR1 and the second line end portion TR2 and expose portions of the first line end portion TR1 and second line end portion TR2. Specifically, in the normal direction (Z direction) of the substrate 100*a*, the opening area OP of the insulating layer PV2 may overlap with the spacing area SP between the first line end portion TR1 and the second line end portion TR2. As described above, the width Wsp of the spacing area SP may be greater than or equal to 2.5 micrometers and less than or equal to 10 micrometers (2.5 μm≤width Wsp≤10 μm), or greater than or equal to 3.5 micrometers and less than or equal to 9.5 micrometers, or greater than or equal to 4 micrometers and less than or equal to 9 micrometers, or greater than or equal to 4.5 micrometers and less than or equal to 8.5 micrometers, for example, 5 micrometers, 5.5 micrometers, 6 micrometers, 6.5 micrometers, 7 micrometers, 7.5 micrometers or 8 micrometers, but it is not limited thereto.

In accordance with some embodiments, the exposed portions of the first line end portion TR1 and the second line end portion TR2 may each have a width Wtr, and the width Wtr may be greater than or equal to 1 micrometer and less than or equal to 6 micrometers (1 μm≤width Wtr≤6 μm), or the width Wtr may be greater than or equal to 2 micrometers and less than or equal to 5 micrometers (2 μm≤width Wtr≤5 μm), or the width Wtr may be greater than or equal to 2.5 micrometers and less than or equal to 4.5 micrometers (2.5 μm≤width Wtr≤4.5 μm), for example, 3 μm, 3.5 μm or 4 μm, but it is not limited thereto. In accordance with some embodiments, the width Wtr refers to the maximum width of the exposed circuit ends (the first line end portion TR1 and the second line end portion TR2) measured in any cross-section in a direction perpendicular to the normal direction of the substrate 100*a* (for example, the X direction). In accordance with some embodiments, the widths Wtr of the first line end portion TR1 and the second line end portion TR2 may be the same or different.

Figure 5A:
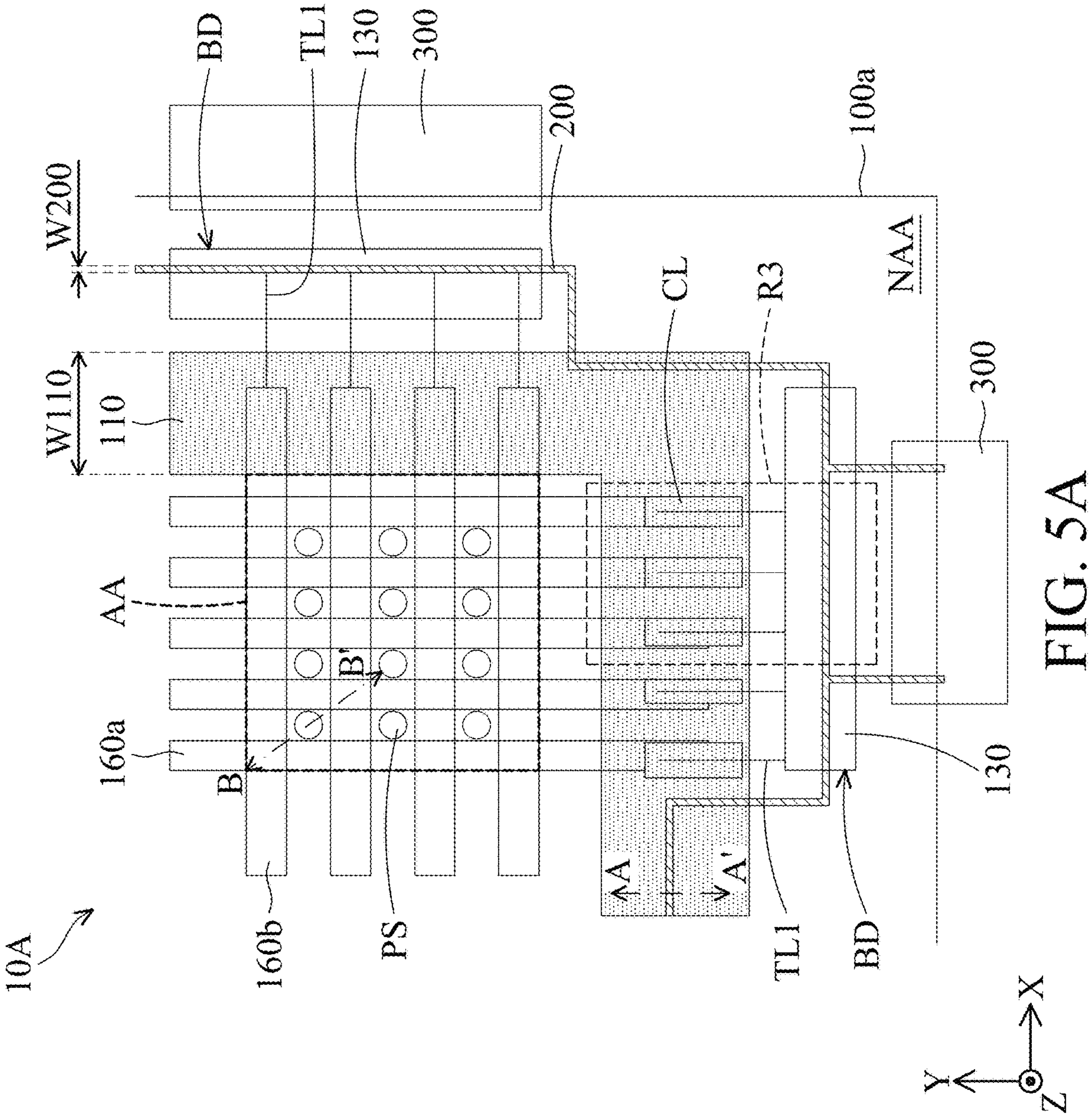
FIG. 5A is a partial top-view diagram of an electronic device in accordance with some embodiments of the present disclosure.
Figure 5B:
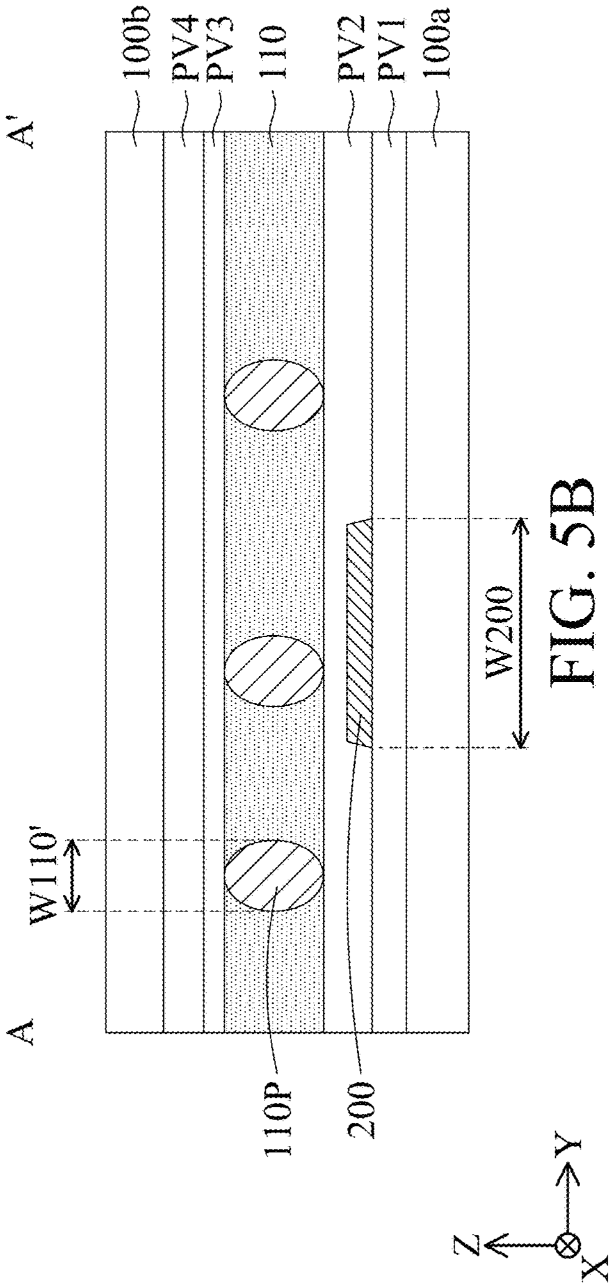
FIG. 5B is a cross-sectional diagram of the electronic device taken along the section line A-A' in FIG. 5A in accordance with some embodiments of the present disclosure.
Figure 5C:
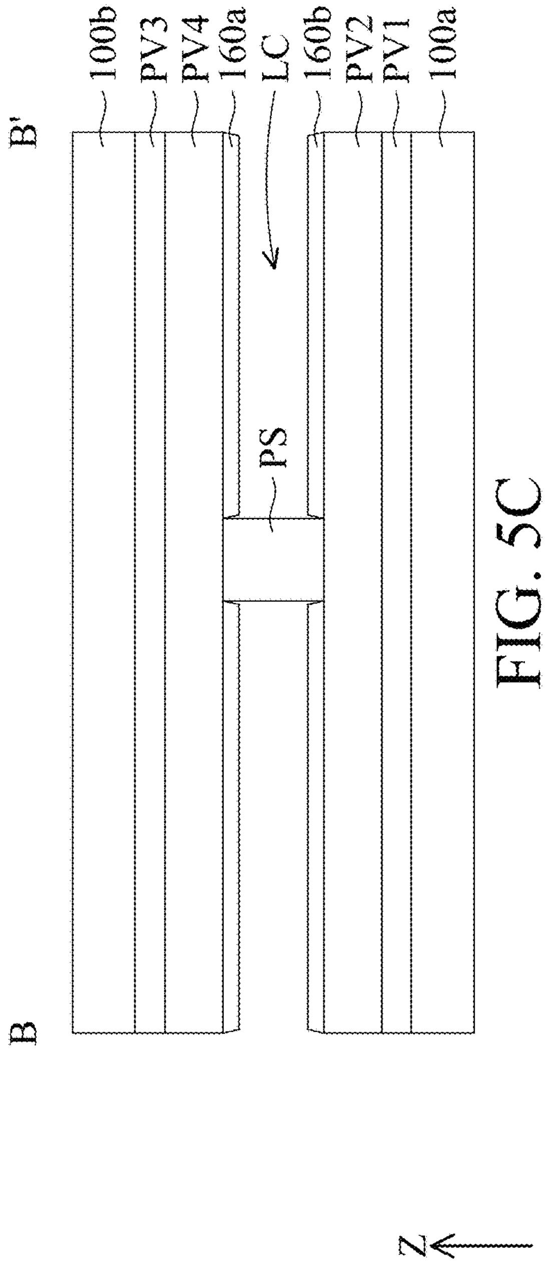
FIG. 5C is a cross-sectional diagram of the electronic device taken along the section line B-B' in FIG. 5A in accordance with some embodiments of the present disclosure.

Next, please refer to FIG. 5A, FIG. 5B and FIG. 5C. FIG. 5A is a partial top-view diagram of the electronic device 1 in accordance with some embodiments of the present disclosure. FIG. 5B is a cross-sectional diagram of the electronic device 1 taken along the section line A-A' in FIG. 5A (for example, corresponding to the peripheral area NAA) in accordance with some embodiments of the present disclosure. FIG. 5C is a cross-sectional diagram of the electronic device 1 taken along the section line B-B' in FIG. 5A (for example, corresponding to the active area AA) in accordance with some embodiments of the present disclosure. It should be understood that substrate 100*b* is omitted from FIG. 5A for clarity of illustration.

As shown in FIG. 5A and FIG. 5B, the sealant 110 may be disposed between the substrate 100*a* and the substrate 100*b* and includes a plurality of conductive particles 110P. In accordance with some embodiments, the width W200 of the conductive ring 200 may be greater than or equal to 20 micrometers and less than the width W110 of the sealant 110 (20 μm≤width W200≤width W110), but it is not limited thereto. In accordance with some embodiments, the width W200 of the conductive ring 200 may be greater than or equal to 30 micrometers (or 40 micrometers) and less than the width W110 of the sealant 110. In accordance with some embodiments, the width W200 of the conductive ring 200 may be greater than the width W110' of at least one of the plurality of conductive particles 110P (width W110'≤width W200). In accordance with some embodiments, the width W200 refers to the average of the widths of the conductive ring 200 measured at any three positions in a direction perpendicular to the normal direction of the substrate 100*a* (such as the X direction, but it is not limited thereto). In accordance with some embodiments, the width W110 refers to the average of the widths of the sealant 110 measured at any three positions in a direction perpendicular to the normal direction of the substrate 100*a* (such as the X direction, but it is not limited thereto).

In accordance with some embodiments, the width W110' of the conductive particle 110P may be greater than or equal to 5 micrometers and less than or equal to 10 micrometers (5 μm≤width W110'≤10 μm), such as 6 micrometers, 7 micrometers, 8 micrometers or 9 micrometers, but it is not limited thereto. In accordance with some embodiments, the width W110' refers to the average of the maximum widths of any three conductive particles 110P measured after bonding in a direction perpendicular to the normal direction of the substrate 100*a* (such as the X direction, but it is not limited thereto).

In accordance with some embodiments, the sealant 110 may include photo-curing glue, thermal-curing glue, photo-thermal-curing glue, another suitable material, or a combination thereof, but it is not limited thereto.

In accordance with some embodiments, the conductive particles 110P may be formed of conductive materials. For example, the conductive particles 110P may include copper (Cu), silver (Ag), gold (Au), tin (Sn), aluminum (Al), molybdenum (Mo), tungsten (W), chromium (Cr), nickel (Ni), platinum (Pt), titanium (Ti), alloys of the aforementioned metals, another suitable material or a combination thereof, but it is not limited thereto.

As shown in FIG. 5A and FIG. 5C, in accordance with some embodiments, the panel 10A may further include an electrode 160*a*, an electrode 160*b*, a modulating material LC (such as a liquid-crystal material or an electrophoretic material), and a spacer element PS. The electrode 160*a*, the electrode 160*b*, the modulating material LC, and the spacer element PS may be disposed between the substrate 100*a* and the substrate 100*b* and may be located in the active area AA. A plurality of electrodes 160*a* and a plurality of electrodes 160*b* may be interlaced with each other to form multiple overlapping areas. These overlapping areas can serve as pixel areas, but it is not limited thereto. The active area AA may be defined as the area that frames all the overlapping areas, and the peripheral area NAA may be defined as the area excluding the active area AA. In accordance with some embodiments, the electrode 160*a* and the electrode 160*b* may partially extend into the peripheral area NAA and partially overlap with the sealant 110 in the normal direction (Z direction) of the substrate 100*a*. In accordance with some embodiments, the sealant 110 may be disposed in the peripheral area NAA. In accordance with some embodiments, the modulating material LC may be disposed between the electrode 160*a* and the electrode 160*b*. Furthermore (as shown in FIG. 5C), the panel 10A may include an insulating layer PV3 and/or an insulating layer PV4 disposed on the substrate 100*b*, and the insulating layer PV4 may be disposed between the modulating material LC and the insulating layer PV3. In accordance with some embodiments, the electrode 160*b* may be disposed between the insulating layer PV2 and the modulating material LC, and the electrode 160*a* may be disposed between the insulating layer PV4 and the modulating material LC. In accordance with some embodiments, the spacer element PS may be disposed between the insulating layer PV2 and the insulating layer PV4. In accordance with some embodiments, the spacing element PS may be disposed between two adjacent electrodes 160*a*. In accordance with some embodiments, the spacing element PS may be disposed between two adjacent electrodes 160*b*. In accordance with some embodiments, in the normal direction (Z direction) of the substrate 100*a*, the spacer element PS does not overlap with the electrode 160*a* and/or the electrode 160*b*. In accordance with some embodiments, in the normal direction (Z direction) of the substrate 100*a*, the spacer element PS does not overlap with the overlapping area (such as the pixel area) of the electrode 160*a* and the electrode 160*b*. Through this design, the impact of the spacer element PS on the modulation of the modulating material LC in the overlapping area (such as the pixel area) can be reduced.

In accordance with some embodiments, the electrode 160*a* may be electrically connected to the line TL1 through a connection structure CL, and then electrically connected to the electronic component 130 (not illustrated) on the electronic component bonding area BD. The details of the connection structure CL (such as FIG. 5A, FIG. 5C and FIG. 5E) will be explained below. In accordance with some embodiments, the electrode 160*b* may be electrically connected to the electronic component 130 on another electronic component bonding area BD through the signal line SL (not illustrated in FIG. 5A, please refer to the subsequent FIG. 6C). In accordance with some embodiments, the electrode 160*a* and/or the electrode 160*b* may include a transparent conductive material. In accordance with some embodiments, the transparent conductive material may include transparent conductive oxide (TCO), for example, may include indium tin oxide (ITO), antimony zinc oxide (AZO), tin oxide (SnO), zinc oxide (ZnO), indium zinc oxide (IZO), indium gallium zinc oxide (IGZO), indium tin zinc oxide (ITZO), antimony tin oxide (ATO), another suitable transparent conductive material or a combination thereof, but it is not limited thereto. Furthermore, the material of the electrode 160*a* may be the same as or different from the material of the electrode 160*b*.

In accordance with some embodiments, an electric field may be applied to the modulating material LC through the electrode 160*a* and the electrode 160*b* to change the optical properties (e.g., arrangement manner) of the modulating material LC. In accordance with some embodiments, the modulating material LC may include a liquid-crystal material, such as cholesteric liquid crystal or another suitable liquid-crystal material, but it is not limited thereto. In accordance with some embodiments, the material of the spacer element PS may include a photoresist material, but it is not limited thereto.

Figure 5E:
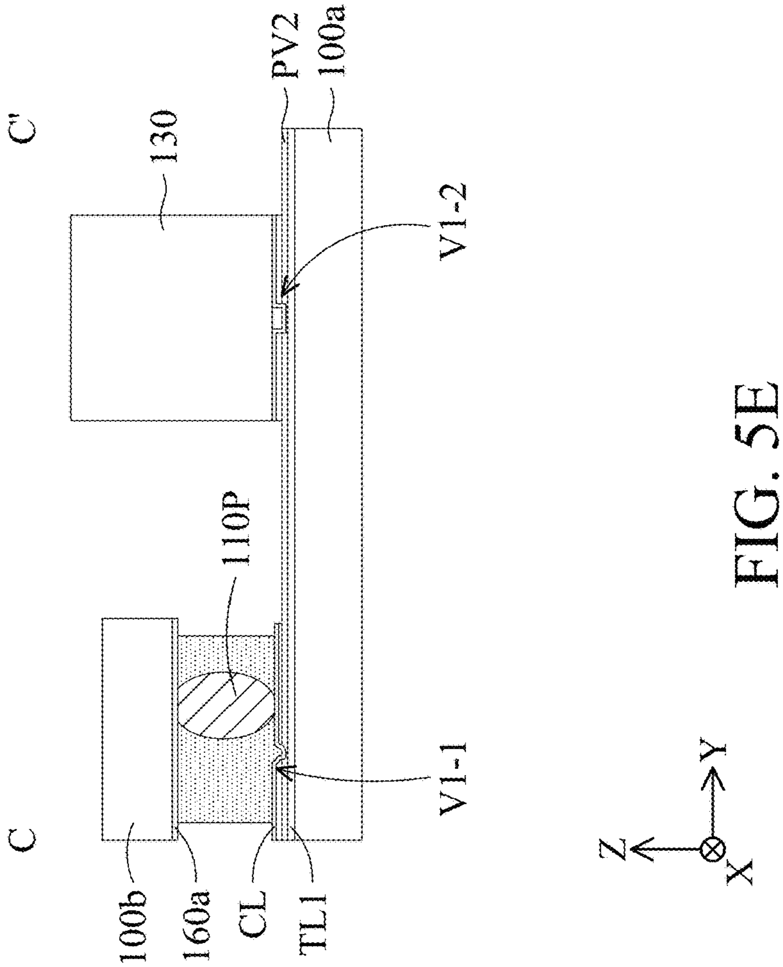
FIG. 5E is a cross-sectional diagram of the electronic device taken along the section line C-C' in FIG. 5D in accordance with some embodiments of the present disclosure.
Figure 5D:
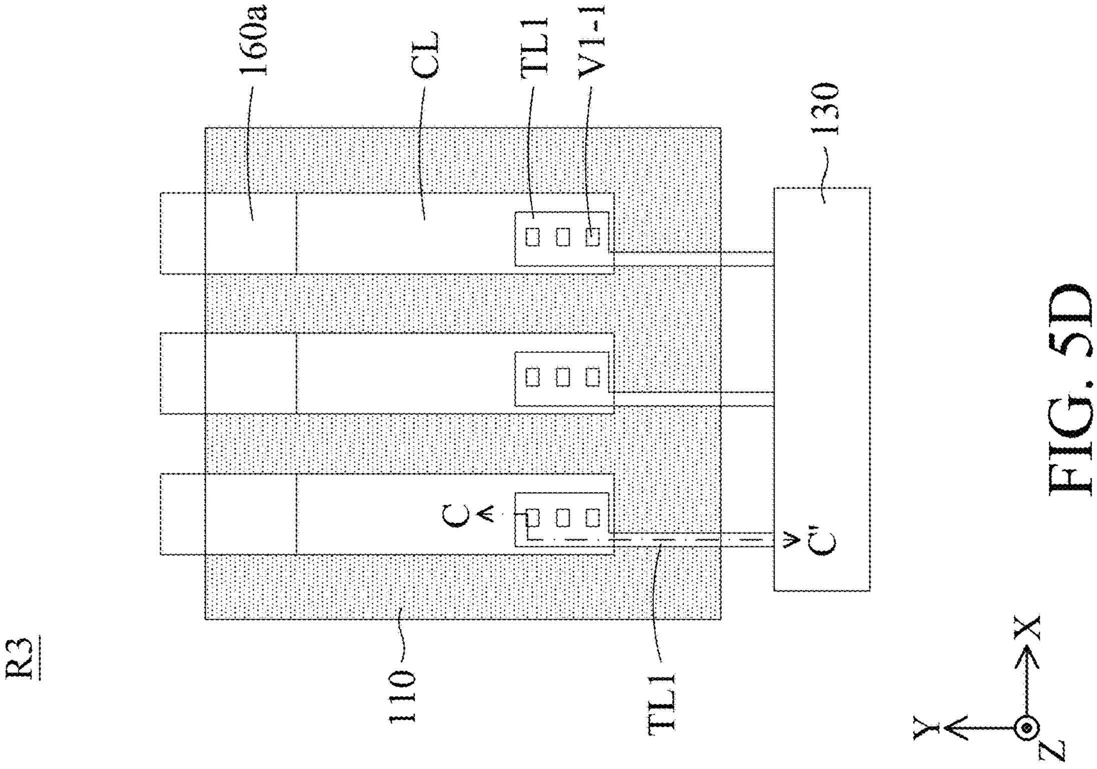
FIG. 5D is a top-view diagram of the electronic device corresponding to the region R3 of FIG. 5A in accordance with some embodiments of the present disclosure.

Next, please refer to FIG. 5D and FIG. 5E. FIG. 5D is a top-view diagram of the electronic device 1 corresponding to the region R3 of FIG. 5A in accordance with some embodiments of the present disclosure. FIG. 5E is a cross-sectional diagram of the electronic device 1 taken along the section line C-C' in FIG. 5D in accordance with some embodiments of the present disclosure.

As shown in FIG. 5D and FIG. 5E, in accordance with some embodiments, the electrode 160*a* may be electrically connected to the line TL1 through the conductive particles 110P in the sealant 110 and the connection structure CL, and then electrically connected to the electronic component 130. In accordance with some embodiments, the connection structure CL may be electrically connected to the line TL1 through a via hole V1-1 of the insulating layer PV2, and the electronic component 130 also may be electrically connected to the line TL1 through a via hole V1-2 of the insulating layer PV2.

Figure 6A:
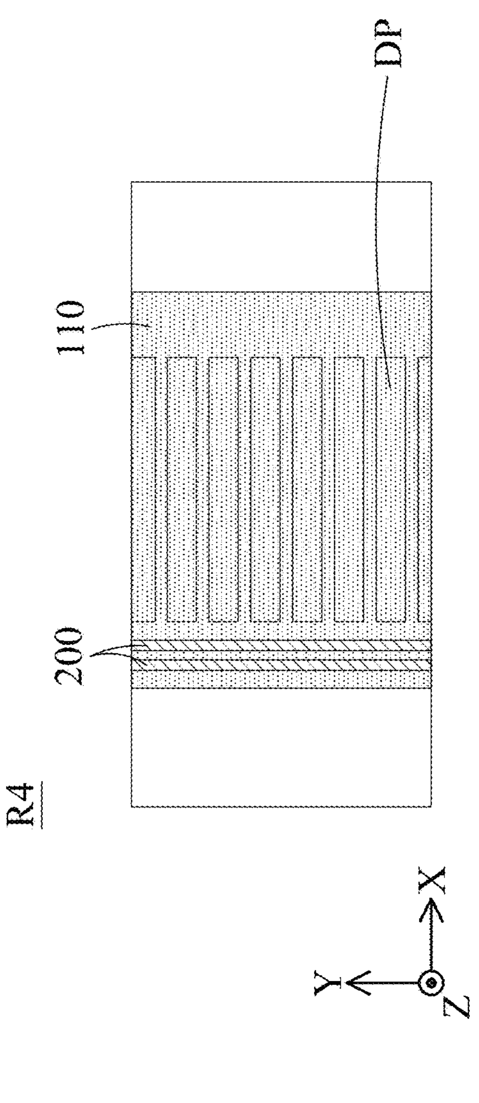
FIG. 6A is a top-view diagram of the electronic device corresponding to the region R4 of FIG. 1 in accordance with some embodiments of the present disclosure.

Next, please refer to FIG. 6A, which is a top-view diagram of the electronic device 1 corresponding to the region R4 of FIG. 1 in accordance with some embodiments of the present disclosure. As shown in FIG. 6A, in accordance with some embodiments, the sealant 110 may cover a portion of the conductive ring 200. The sealant 110 can be used to protect the conductive ring 200 and reduce the risk of moisture affecting the performance of the conductive ring 200. In addition, when the conductive ring 200 is subjected to a large instantaneous current, the sealant 110 can also be used to share the current flowing through it. In accordance with some embodiments, the panel may further include a plurality of dummy conductive pads DP. These dummy conductive pads DP may be disposed adjacent to the conductive ring 200. These dummy conductive pads DP can improve the flatness of the coating of the sealant 110. In accordance with some embodiments, these dummy conductive pads DP may include a metal conductive material and/or a transparent conductive material, such as transparent conductive oxide, but it is not limited thereto. These dummy conductive pads DP may be, for example, electrically floating. In accordance with some embodiments, the panel may have more than one conductive ring 200. For example, the number of conductive rings 200 may be between 1 and 3, but it is not limited thereto. In accordance with some embodiments, the configuration of multiple conductive rings 200 can help disperse electrostatic charges at equal potentials.

Figure 6B:
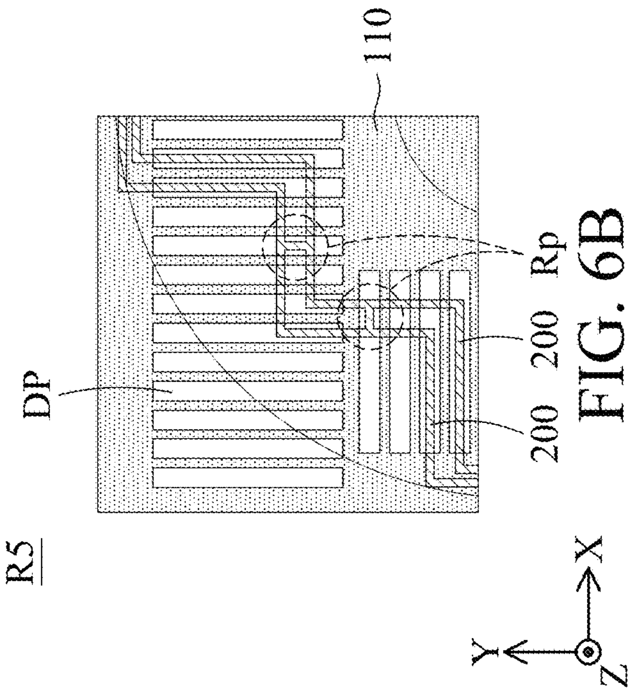
FIG. 6B is a top-view diagram of the electronic device corresponding to the region R5 of FIG. 1 in accordance with some embodiments of the present disclosure.

Next, please refer to FIG. 6B, which is a top-view diagram of the electronic device 1 corresponding to the region R5 of FIG. 1 in accordance with some embodiments of the present disclosure. As shown in FIG. 6B, in accordance with some embodiments, the panel may have a plurality of conductive rings 200. Specifically, the panel may include a conductive ring 200 and another conductive ring 200, and another conductive ring 200 is connected in parallel to the conductive ring 200 (as shown in the regions Rp in the figure). In accordance with some embodiments, in the normal direction (Z direction) of the substrate 100*a*, the conductive ring 200 may partially overlap with the dummy conductive pads DP and the sealant 110, and the position where the conductive ring 200 is connected in parallel with another conductive ring 200 may also overlap with the dummy conductive pads DP and the sealant 110. In accordance with some other embodiments, the position where the conductive ring 200 is connected in parallel to another conductive ring 200 may be adjusted according to requirements. It should be understood that FIG. 1 only illustrates one conductive ring 200, but it may include multiple conductive rings, and these conductive rings may be connected in parallel.

Figure 6C:
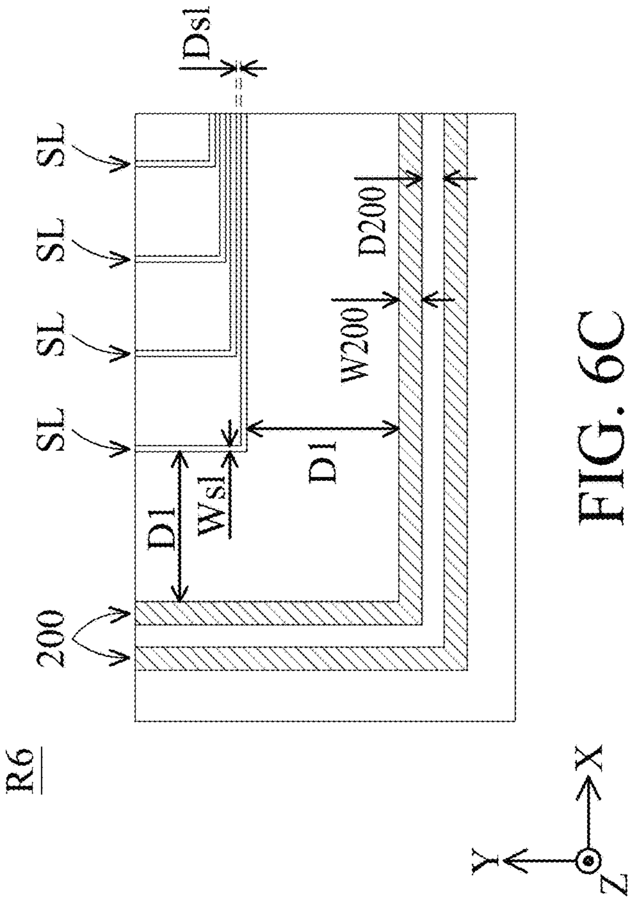
FIG. 6C is a top-view diagram of the electronic device corresponding to the region R6 of FIG. 1 in accordance with some embodiments of the present disclosure.

Next, please refer to FIG. 6C, which is a top-view diagram of the electronic device 1 corresponding to the region R6 of FIG. 1 in accordance with some embodiments of the present disclosure. As shown in FIG. 6C, in accordance with some embodiments, the panel may further include a signal line SL, the signal line SL may be adjacent to the conductive ring 200. The signal line SL has a width Wsl. In accordance with some embodiments, the ratio of the width W200 of the conductive ring 200 to the width Wsl of the signal line SL may be greater than or equal to 2 and less than or equal to 20 (2≤width W200/width Wsl≤20), or greater than or equal to 3 and less than or equal to 18, or greater than or equal to 4 and less than or equal to 16, or greater than or equal to 5 and less than or equal to 15, for example, 6, 7, 8, 9, 10, 11, 12, 13 or 14, but it is not limited thereto. In accordance with some embodiments, the width Wsl refers to the average of the widths of the signal lines SL measured at any three positions in the direction perpendicular to the normal direction Z of the substrate 100*a* (such as the X direction, but it is not limited thereto).

Furthermore, there is a distance D1 between the conductive ring 200 and the signal line SL (the signal line that transmits the signal of the electronic component 130 to the active area AA) closest to the conductive ring 200. In accordance with some embodiments, the distance D1 between the conductive ring 200 and the signal line SL may be greater than or equal to the distance Dsl between the signal lines SL (distance D1≥distance Dsl). In accordance with some embodiments, the distance D1 refers to the minimum distance between the conductive ring 200 and the signal line SL in a direction perpendicular to the normal direction Z of the substrate 100*a* (such as the X direction, but it is not limited thereto). In accordance with some embodiments, two adjacent conductive rings 200 are separated by a distance D200, two adjacent signal lines SL are separated by a distance Dsl, and the distance D200 between two adjacent conductive rings 200 may be greater than or equal to the distance Dsl between the signal lines SL (distance D200≥distance Dsl). The distance D200 refers to the minimum distance between two adjacent conductive rings 200 in a direction perpendicular to the normal direction Z of the substrate 100*a* (such as the X direction, but it is not limited thereto). The distance Dsl refers to the minimum distance between two adjacent signal lines SL in a direction perpendicular to the normal direction of the substrate 100*a*.

Figure 7C:
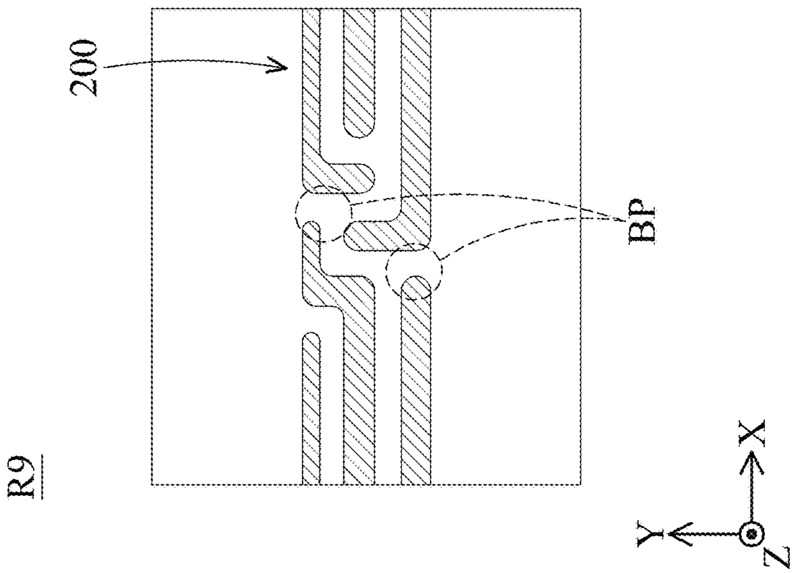
FIG. 7C is a top-view diagram of the electronic device corresponding to the region R9 of FIG. 1 in accordance with some embodiments of the present disclosure.
Figure 7B:
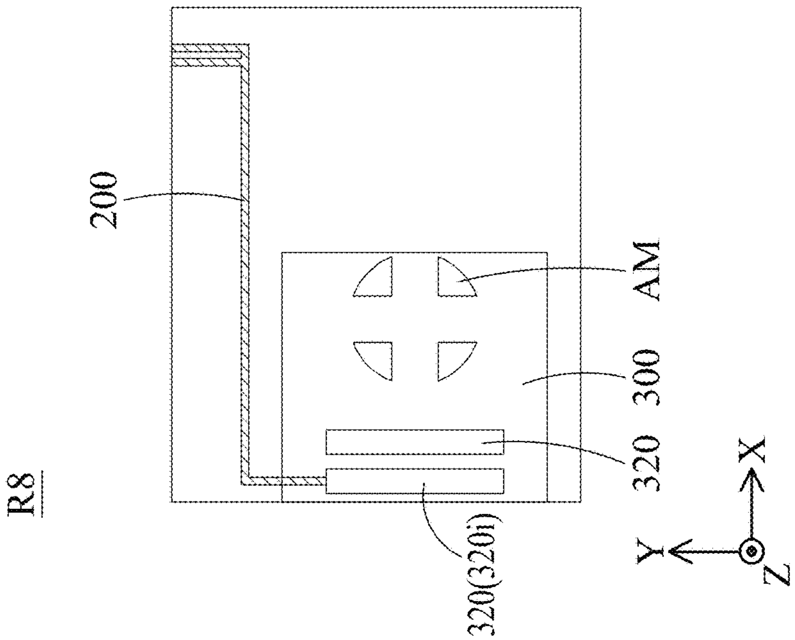
FIG. 7B is a top-view diagram of the electronic device corresponding to the region R8 of FIG. 1 in accordance with some embodiments of the present disclosure.
Figure 7A:
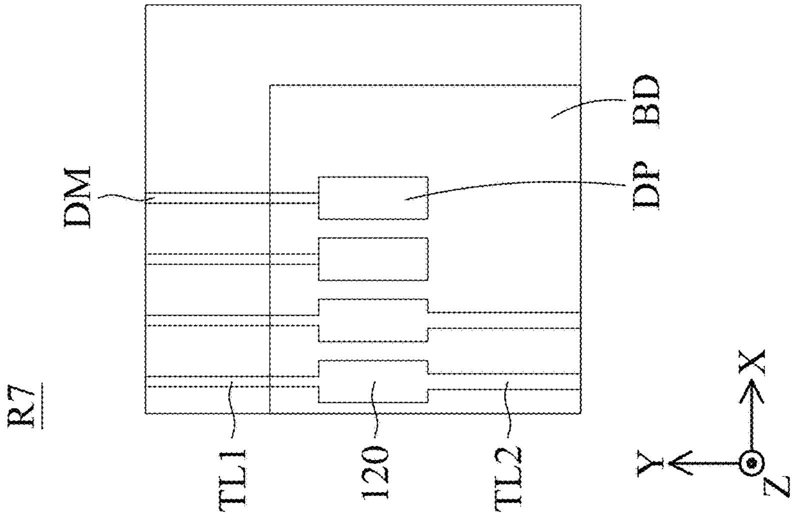
FIG. 7A is a top-view diagram of the electronic device corresponding to the region R7 of FIG. 1 in accordance with some embodiments of the present disclosure.

Next, please refer to FIG. 7A, which is a top-view diagram of the electronic device 1 corresponding to the region R7 of FIG. 1 in accordance with some embodiments of the present disclosure. As shown in FIG. 7A, in accordance with some embodiments, the panel may further include a dummy conductive line DM electrically connected to the dummy conductive pad DP. The dummy conductive pad DP and the dummy conductive line DM may be adjacent to the conductive pad 120 that is connected to the line TL1 and the line TL2. The dummy conductive pad DP and the conductive pad 120 may have substantially the same shape or size. In accordance with some embodiments, the dummy conductive pad DP and the dummy conductive line DM may be disposed on the electronic component bonding area BD, and the dummy conductive pad DP and the dummy conductive line DM may be electrically floating or connected to a ground potential.

Next, please refer to FIG. 7B, which is a top-view diagram of the electronic device 1 corresponding to the region R8 of FIG. 1 in accordance with some embodiments of the present disclosure. As shown in FIG. 7B, in accordance with some embodiments, the conductive ring 200 may be connected in series with the designated conductive pad 320 (labeled as 320*i*) of the circuit board 300 to form an electrostatic discharge path connected to the system terminal. In accordance with some embodiments, an alignment marks AM on the circuit board 300 may be disposed adjacent to the conductive pad 320.

Next, please refer to FIG. 7C, which is a top-view diagram of the electronic device 1 corresponding to the region R9 of FIG. 1 in accordance with some embodiments of the present disclosure. As shown in FIG. 7C, in accordance with some embodiments, the conductive ring 200 may have a fracture structure BP. The fracture structure BP may be, for example, located on the side of the substrate 100*a* different from the electronic component bonding area BD (such as the region R9 shown in FIG. 1). The conductive ring 200 may be discontinuous. Through the design of the fracture structure BP, the antenna effect produced when the conductive ring 200 is in a ring shape may be reduced, thereby reducing the impact on the performance of the capacitive electronic device. In accordance with some embodiments, the fracture structure BP may be located at the corner of the panel, but it is not limited thereto. It should be noted that FIG. 7C illustrates that the three conductive rings 200 located in the region R9 may have fracture structures BP, but it is not limited thereto. The number of conductive rings 200 with fracture structures BP may vary according to the design. In addition, the fracture structures BP may have arc-shaped edges, and the fracture structures BP of different conductive rings 200 may have bending structures.

Figure 8B:
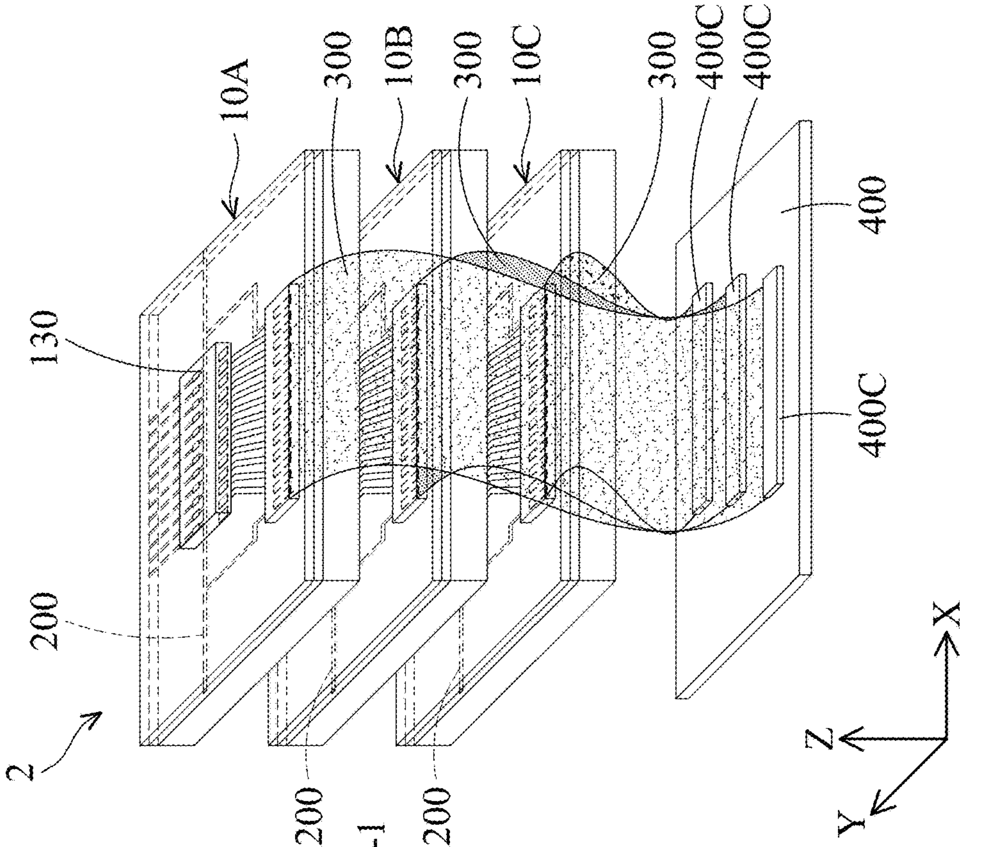
FIG. 8B is a three-dimensional diagram of an electronic device in accordance with some embodiments of the present disclosure.
Figure 8A:
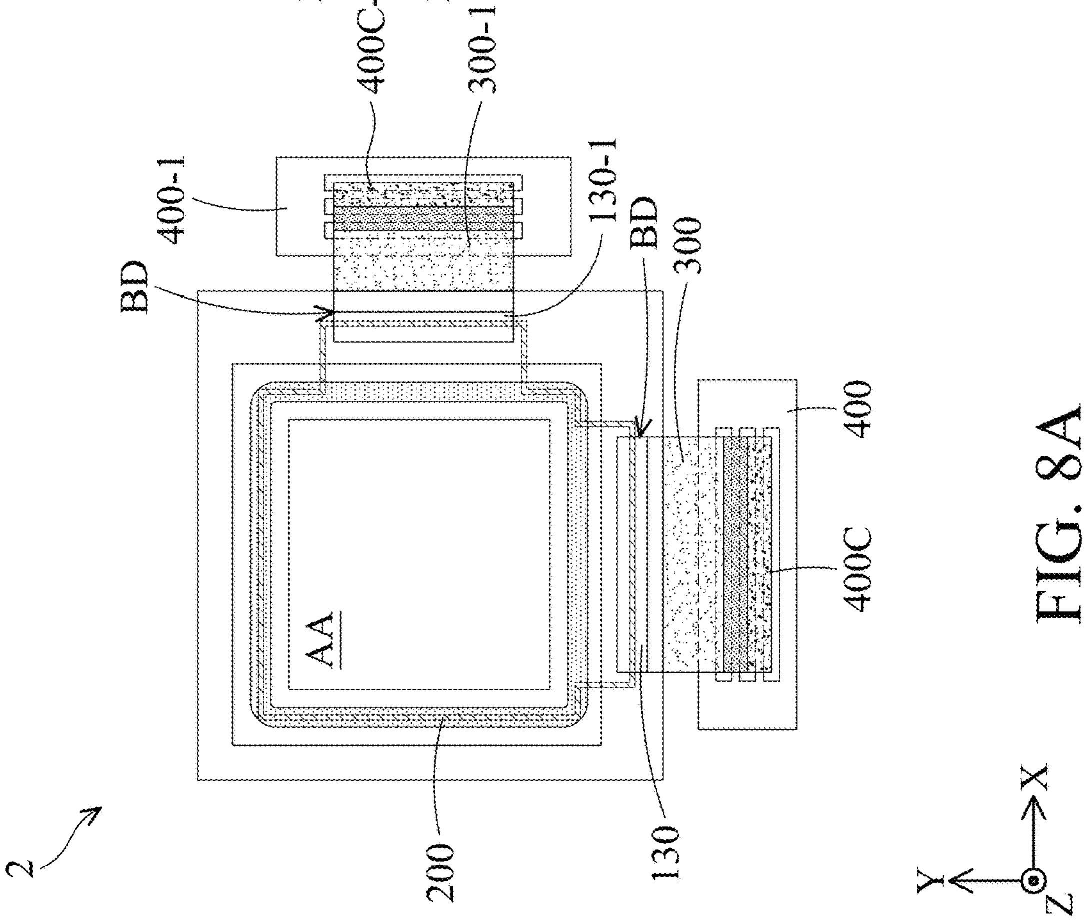
FIG. 8A is a top-view diagram of an electronic device in accordance with some embodiments of the present disclosure.

Next, please refer to FIG. 8A and FIG. 8B. FIG. 8A is a top-view diagram of an electronic device 2 in accordance with some other embodiments of the present disclosure. FIG. 8B is a three-dimensional diagram of the electronic device 2 in accordance with some embodiments of the present disclosure. It should be understood that the same or similar components or elements in above and below contexts are represented by the same or similar reference numerals. The materials, manufacturing methods and functions of these components or elements are the same or similar to those described above, and thus will not be repeated in the following description.

As shown in FIG. 8A and FIG. 8B, the electronic device 2 may include a plurality of panels, for example, a panel 10A, a panel 10B and a panel 10C. The panel 10A, the panel 10B and the panel 10C may be stacked in sequence. The panel 10B may be disposed under the panel 10A, and the panel 10C may be disposed under the panel 10B. Attachments (not illustrated) may be provided between the panel 10A, the panel 10B and the panel 10C to adhere to one another. The panel 10B and/or panel 10C may have a similar or identical structure to panel 10A. In accordance with some embodiments, the panel 10B and/or the panel 10C may respectively include a substrate 100*a* (referring to FIGS. 5B to 5C), a substrate 100*b* (referring to FIGS. 5B to 5C), a sealant 110 (referring to FIG. 5C), a plurality of conductive pads 120 (referring to FIGS. 5B to 5C), a conductive ring 200 (referring to FIG. 2), and an electrostatic protection structure PT (referring to FIG. 3C or FIG. 4B). The substrate 100*a* of the panel 10B and/or the panel 10C may include the electronic component bonding area BD as mentioned above. The substrate 100*b* may be disposed opposite to the substrate 100*a*. The sealant 110 may be disposed between the substrate 100*a* and the substrate 100*b* and include a plurality of conductive particles 110P. The plurality of conductive pads 120 may be disposed on the electronic component bonding area BD. The conductive ring 200 may be disposed on the substrate 100*a*. The electrostatic protection structure PT may include a first line end portion TR1 and a second line end portion TR2 that are opposite to each other. The first line end portion TR1 may be connected to one of the plurality of conductive pads 120, and the second line end portion TR2 may be connected to the conductive ring 200. The conductive ring 200 may be electrically connected to a ground potential, and a portion of the conductive ring 200 may overlap with the sealant 110. For details about the panel 10B and/or the panel 10C, please refer to the aforementioned panel 10A.

In addition, the electronic device 2 may include a plurality of circuit boards 300 and control boards 400. The circuit boards 300 may be electrically connected to the conductive rings 200 in the corresponding panels (the panel 10A, the panel 10B or the panel 10C) respectively. The control board 400 may be electrically connected to the conductive ring 200 in the panels (the panel 10A, the panel 10B or the panel 10C) through the plurality of circuit boards 300, and the length of each of the circuit boards 300 may be different from one another. The plurality of circuit boards 300 may at least partially overlap each other. Specifically, the plurality of circuit boards 300 disposed in the electronic component bonding area BD may be electrically connected to the components or signal lines (such as the electrode 160*a* or the electrode 160*b*) in the active area AA through the corresponding electronic components 130. In accordance with some embodiments, the electronic device 2 may include a plurality of circuit boards 300-1 and control boards 400-1. The plurality of circuit boards 300-1 may be electrically connected to the conductive rings 200 in the corresponding panels (the panel 10A, the panel 10B or the panel 10C) respectively. The control board 400-1 may be electrically connected to the conductive ring 200 in the panel (the panel 10A, the panel 10B or the panel 10C) through the plurality of circuit boards 300-1, and the length of each of the circuit boards 300-1 may be different from one another. The plurality of circuit boards 300-1 may at least partially overlap each other. Specifically, the plurality of circuit boards 300-1 disposed in the electronic component bonding area BD may be electrically connected to the components or electrodes (such as electrode 160*a* or electrode 160*b*) in the active area AA through the corresponding electronic components 130-1.

In accordance with some embodiments, the electronic component 130 may be, for example, one of a scan driver chip and a data driver chip, and the electronic component 130-1 may be, for example, the other of a scan driver chip and a data driver chip.

In accordance with some embodiments, the panel 10A, the panel 10B, and the panel 10C may be array panels that reflect light of different colors, such as a red array panel, a green array panel, and a blue array panel, but they are not limited thereto. In accordance with some embodiments, the control board 400 and/or the control board 400-1 may include a printed circuit board (PCB), but it is not limited thereto. In accordance with some embodiments, the circuits (not illustrated) in the control board 400 and/or the control board 400-1 may be electrically connected to a ground potential, so that the conductive rings 200 in each panel are grounded. In addition, as shown in FIG. 8B, since the circuit boards 300 and/or the circuit boards 300-1 are flexible and easy to bend, the circuit boards 300 and/or the circuit boards 300-1 with different lengths can overlap each other and be connected to the control board 400.

In accordance with some embodiments, the control board 400 may include a plurality of connecting components 400C. The plurality of circuit boards 300 may be electrically connected to the control board 400 through the plurality of connecting components 400C, and the plurality of connecting components 400C may be arranged in sequence along one direction. In this embodiment, the aforementioned direction may be the extending direction of the short side of the control panel 400 (for example, the Y direction), but it is not limited thereto. In accordance with some embodiments, the control board 400-1 may include a plurality of connecting components 400C-1, and the plurality of circuit boards 300-1 may be electrically connected to the control board 400-1 through the plurality of connecting components 400C-1, and the plurality of connecting components 400C-1 may be arranged in sequence along one direction. In this embodiment, the aforementioned direction may be the extending direction of the short side of the control panel 400-1 (for example, the X direction), but it is not limited thereto. It should be noted that FIG. 8B only illustrates the connection relationship of each connecting component 400C of the control board 400, but the connection relationship of each connecting component 400C-1 of the control board 400-1 may also have a similar design.

Figure 9B:
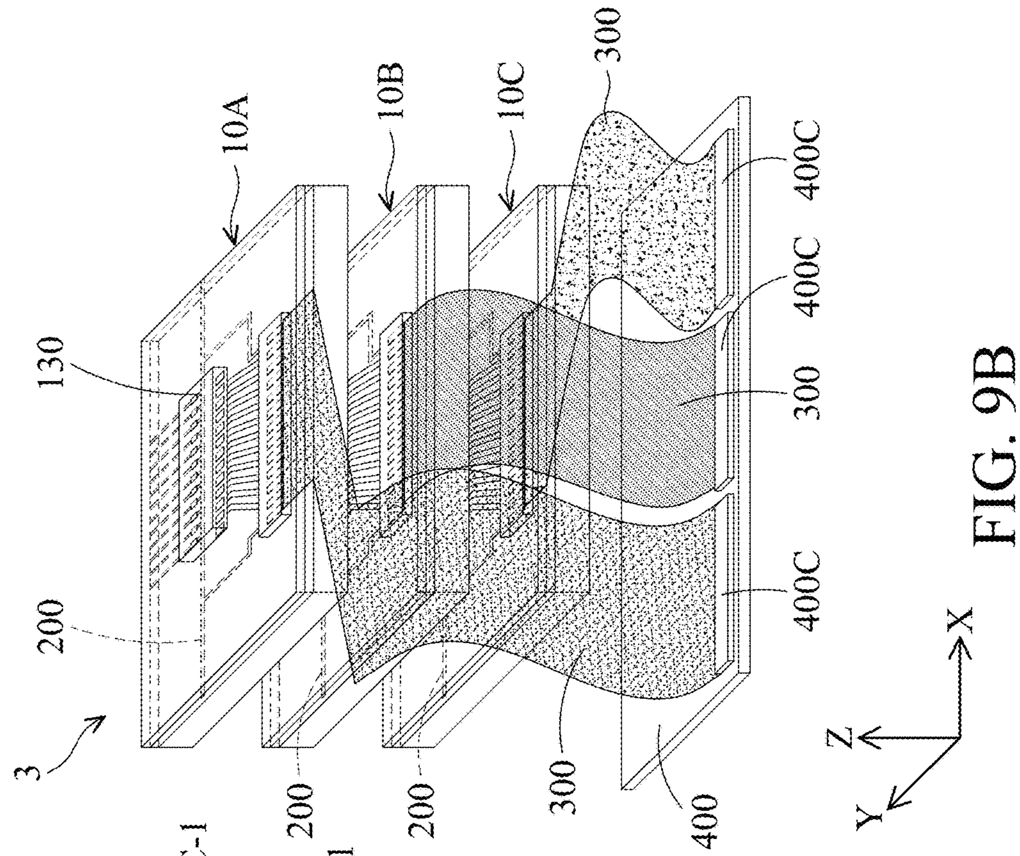
FIG. 9B is a three-dimensional diagram of an electronic device in accordance with some embodiments of the present disclosure.
Figure 9A:
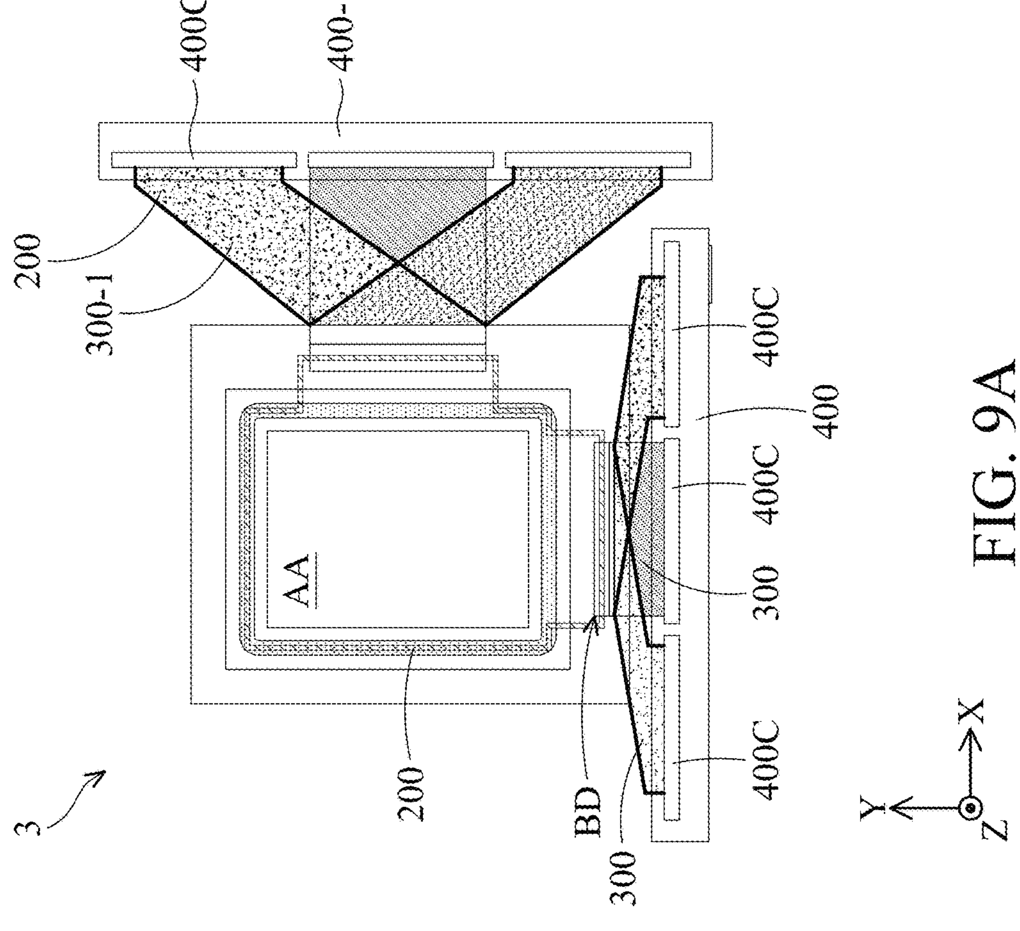
FIG. 9A is a top-view diagram of an electronic device in accordance with some embodiments of the present disclosure.

Next, please refer to FIG. 9A and FIG. 9B. FIG. 9A is a top-view diagram of an electronic device 3 in accordance with some other embodiments of the present disclosure. FIG. 9B is a three-dimensional diagram of the electronic device 3 in accordance with some embodiments of the present disclosure.

As shown in FIG. 9A and FIG. 9B, similarly, the electronic device 3 may include a plurality of circuit boards 300 and control boards 400. The circuit board 300 may be electrically connected to the conductive rings 200 in the panel 10A, the panel 10B and the panel 10C respectively. The control board 400 may include a plurality of connecting components 400C. The plurality of circuit boards 300 may be electrically connected to the control board 400 through the plurality of connecting components 400C, and the plurality of connecting components 400C may be arranged in sequence in one direction. In this embodiment, the aforementioned direction may be the extending direction of the long side of the control panel 400 (for example, the X direction).

Similarly, the electronic device 3 may include a plurality of circuit boards 300-1 and control boards 400-1. The circuit boards 300-1 may be electrically connected to the conductive rings 200 in the panel 10A, the panel 10B and the panel 10C respectively. The control board 400-1 may include a plurality of connecting components 400C-1. The plurality of circuit boards 300-1 may be electrically connected to the control board 400-1 through the plurality of connecting components 400C-1, and the plurality of connecting components 400C-1 can be arranged in sequence in one direction. In this embodiment, the aforementioned direction may be the extending direction of the long side of the control panel 400-1 (for example, the Y direction).

It should be noted that FIG. 9B only illustrates the connection relationship of each connecting component 400C of the control board 400, but the connection relationship of each connecting component 400C-1 of the control board 400-1 may also have a similar design.

In accordance with some other embodiments, the connecting components 400C or connecting component 400C-1 may be arranged in other manners.

Figure 10:
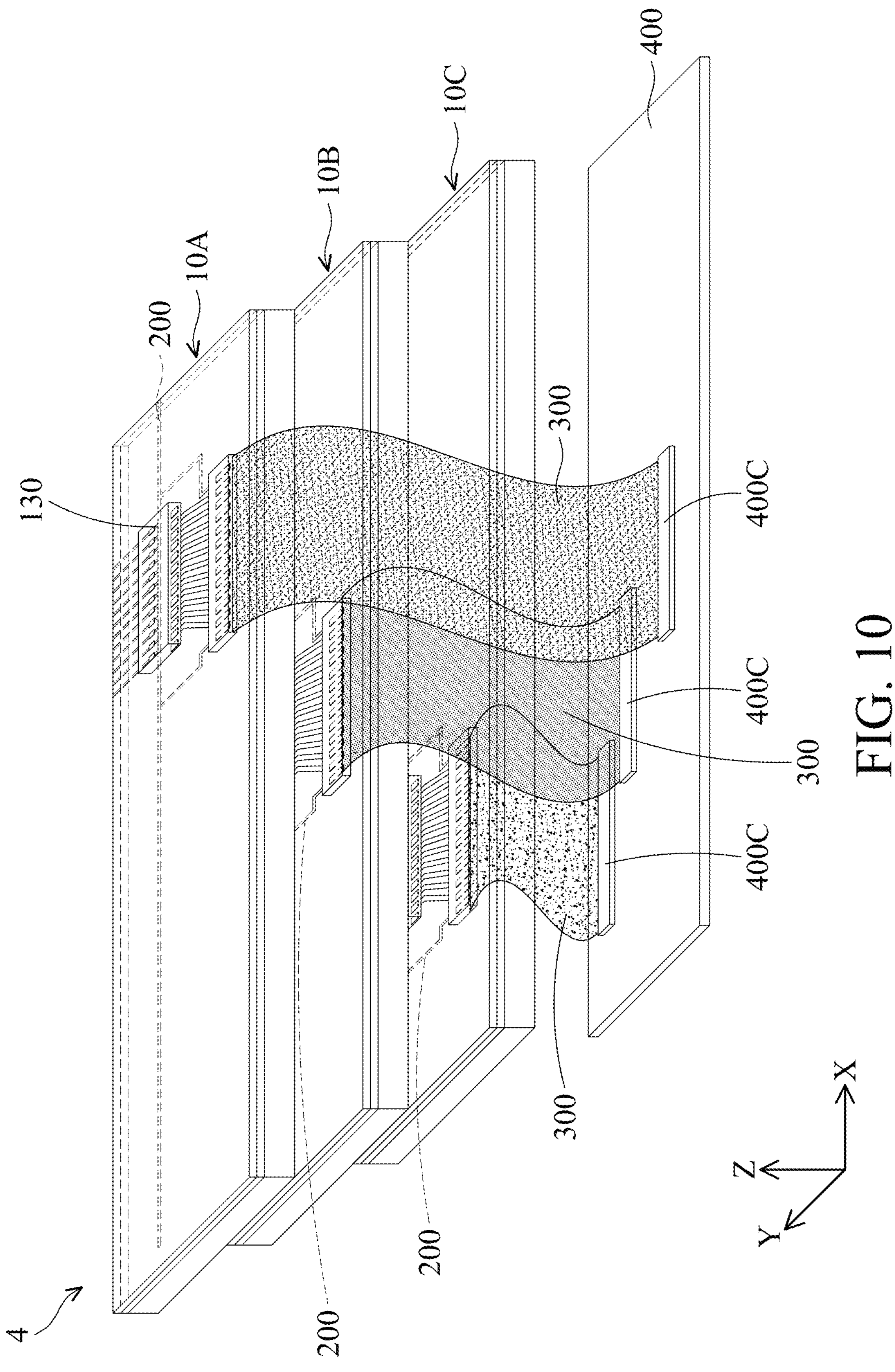
FIG. 10 is a three-dimensional diagram of an electronic device in accordance with some embodiments of the present disclosure.

Next, please refer to FIG. 10, which is a three-dimensional diagram of an electronic device 4 in accordance with some other embodiments of the present disclosure.

As shown in FIG. 10, in accordance with some embodiments, the circuit boards 300 and the electronic component bonding areas BD that are electrically connected to the panel 10A, the panel 10B and the panel 10C may be disposed in a staggered manner. For example, the circuit boards 300 that are electrically connected to the panel 10A, the panel 10B and the panel 10C substantially do not overlap or only partially overlap in the normal direction (Z direction) of the substrate. In accordance with some embodiments, the electronic component bonding areas BD of the panel 10A, the panel 10B and the panel 10C substantially do not overlap or only partially overlap in the normal direction (Z direction) of the substrate. In accordance with some embodiments, the plurality of connecting components 400C may be arranged in a staggered manner.

To summarize the above, in accordance with some embodiment of the present disclosure, the provided electronic device includes a conductive ring and an electrostatic protection structure electrically connected to the conductive ring. The electrostatic discharge accumulated in the electrostatic protection structure can be led away through the conductive ring, thereby reducing component damage caused by electrostatic discharge, thereby improving the reliability of the electronic device. Furthermore, in accordance with the embodiments of the present disclosure, the electrostatic protection structure may not use a semiconductor layer, thus simplifying the manufacturing process or reducing production costs.

Although some embodiments of the present disclosure and their advantages have been described in detail, it should be understood that various changes, substitutions and alterations can be made herein without departing from the spirit and scope of the disclosure as defined by the appended claims. The features of the various embodiments can be used in any combination as long as they do not depart from the spirit and scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Thus, the appended claims are intended to include within their scope such processes, machines, manufacture, compositions of matter, means, methods or steps. Moreover, each claim constitutes an individual embodiment, and the claimed scope of the present disclosure includes the combinations of the claims and embodiments. The scope of protection of the present disclosure is subject to the definition of the scope of the appended claims. Any embodiment or claim of the present disclosure does not need to meet all the purposes, advantages, and features disclosed in the present disclosure.

What is claimed is:

1. An electronic device, comprising:

a first panel, comprising:

- a first substrate comprising a first electronic component bonding area;
- a second substrate disposed opposite to the first substrate;
- a plurality of first conductive pads disposed on the first electronic component bonding area;
- a first conductive ring disposed on the first substrate; and
- a first electrostatic protection structure comprising a first line end portion and a second line end portion that are opposite to each other, wherein the first line end portion is connected to one of the plurality of first conductive pads, the second line end portion is connected to the first conductive ring, and the first conductive ring is electrically connected to a ground potential.

2. The electronic device as claimed in claim 1, further comprising a first sealant disposed between the first substrate and the second substrate and comprising a plurality of conductive particles, wherein a portion of the first conductive ring overlaps with the first sealant, and a width of the first conductive ring is greater than a width of at least one of the plurality of conductive particles.

3. The electronic device as claimed in claim 2, wherein the width of at least one of the plurality of conductive particles is greater than or equal to 5 micrometers and less than or equal to 10 micrometers.

4. The electronic device as claimed in claim 1, wherein the first panel further comprises another first conductive ring, and the another first conductive ring is connected in parallel to the first conductive ring.

5. The electronic device as claimed in claim 1, wherein the first panel further comprises a signal line, the signal line is adjacent to the first conductive ring, and a ratio of a width of the first conductive ring to a width of the signal line is greater than or equal to 2 and less than or equal to 20.

6. The electronic device as claimed in claim 1, wherein a width of the first conductive ring is greater than or equal to 20 micrometers and less than a width of the first sealant.

7. The electronic device as claimed in claim 1, wherein there is a spacing area between the first line end portion and the second line end portion, and the spacing area is separated from the one of the plurality of first conductive pads by a distance, and the distance is greater than or equal to 200 micrometers and less than or equal to 600 micrometers.

8. The electronic device as claimed in claim 1, wherein there is a spacing area between the first line end portion and the second line end portion, and a width of the spacing area is greater than or equal to 2.5 micrometers and less than or equal to 10 4 micrometers.

9. The electronic device as claimed in claim 8, wherein the first panel further comprises an insulating layer, the insulating layer is disposed on the first electrostatic protection structure, the insulating layer has an opening area, the opening area overlaps with the spacing area between the first line end portion and the second line end portion and exposes portions of the first line end portion and the second line end portion.

10. The electronic device as claimed in claim 9, wherein the exposed portions of the first line end portion and the second line end portion each has a width, and the width is greater than or equal to 1 micrometer and less than or equal to 6 micrometers.

11. The electronic device as claimed in claim 1, further comprising:

a second panel disposed under the first panel, wherein the second panel comprises a second conductive ring electrically connected to a ground potential;

a plurality of circuit boards, respectively electrically connected to the first conductive ring in the first panel and the second conductive ring in the second panel; and a control board electrically connected to the first conductive ring and the second conductive ring respectively through the plurality of circuit boards, wherein lengths of the plurality of circuit boards are different from each other.

12. The electronic device as claimed in claim 11, wherein the control board comprises a plurality of connecting components, and the plurality of circuit boards are electrically connected to the control board through the plurality of connecting components, and the plurality of connecting components are arranged in sequence along a direction, wherein the direction is an extending direction of a long side of the control panel or an extending direction of a short side of the control panel.

13. The electronic device as claimed in claim 1, wherein the first panel has an active area and a peripheral area adjacent to the active area, and the first electronic component bonding area is located in the peripheral area.

14. The electronic device as claimed in claim 1, wherein the first panel has an active area and a peripheral area adjacent to the active area, and the first conductive ring is located in the peripheral area and surrounding the active area.

15. The electronic device as claimed in claim 1, further comprising a first circuit board electrically connected to the first panel, wherein the first conductive ring partially overlaps with the first electronic component bonding area and the first circuit board.

16. The electronic device as claimed in claim 1, wherein the first line end portion and the second line end portion are formed by performing a laser cutting process on a line.

17. The electronic device as claimed in claim 1, wherein the first line end portion and the second line end portion are formed by performing a patterning process on a line.

18. The electronic device as claimed in claim 1, wherein the first panel further comprises a first electrode, a second electrode, a modulating material, and a spacer element disposed between the first substrate and the second substrate.

19. The electronic device as claimed in claim 18, wherein the spacer element does not overlap with an overlapping area of the first electrode and the second electrode.

20. The electronic device as claimed in claim 1, wherein the first conductive ring comprises a fracture structure located on a side of the first substrate different from the first electronic component bonding area.

* * * * *